(12) United States Patent
Lysek et al.

(10) Patent No.: US 12,533,300 B2
(45) Date of Patent: Jan. 27, 2026

(54) SELF-ASSEMBLING PEPTIDES IN THE PREVENTION AND TREATMENT OF CAVITATED CARIOUS LESIONS

(71) Applicant: Credentis AG, Windisch (CH)

(72) Inventors: Dominikus Amadeus Lysek, Windisch (CH); Michael Hug, Zofingen (CH); Brian B. Novy, Quincy, MA (US)

(73) Assignee: Credentis AG, Windisch (CH)

( * ) Notice: Subject to any disclaimer, the term of this patent is extended or adjusted under 35 U.S.C. 154(b) by 985 days.

(21) Appl. No.: 17/623,530

(22) PCT Filed: Jul. 9, 2020

(86) PCT No.: PCT/EP2020/069360
§ 371 (c)(1),
(2) Date: Dec. 28, 2021

(87) PCT Pub. No.: WO2021/005153
PCT Pub. Date: Jan. 14, 2021

(65) Prior Publication Data
US 2022/0354751 A1  Nov. 10, 2022

(30) Foreign Application Priority Data
Jul. 10, 2019 (EP) .................... 19185523

(51) Int. Cl.
*A61K 6/20* (2020.01)
*A61C 5/20* (2017.01)
*A61K 6/69* (2020.01)

(52) U.S. Cl.
CPC .................. *A61K 6/20* (2020.01); *A61C 5/20* (2017.02); *A61K 6/69* (2020.01)

(58) Field of Classification Search
CPC ........................................ A61K 6/20
See application file for complete search history.

(56) References Cited

U.S. PATENT DOCUMENTS 5,015,628 A * 5/1991 Reynolds ........... C07K 14/4732
530/324
2006/0154852 A1   7/2006 Boden et al.
(Continued)

FOREIGN PATENT DOCUMENTS

RU      2673820 C2    11/2018
WO      97/36943 A1   10/1997
(Continued)

OTHER PUBLICATIONS

Search Report and Written Opinion issued by Singapore Patent Office, Singapore App. No. 11202114277V, mailed Mar. 3, 2024.
(Continued)

*Primary Examiner* — Michael F Pepitone
(74) *Attorney, Agent, or Firm* — Pabst Patent Group LLP

(57) ABSTRACT

The invention is in the field of caries prevention and treatment, in particular minimally-invasive, or non-invasive dental decay treatment. It relates to a composition and a kit comprising a self-assembling peptide, such as the self-assembling peptide P11-4 or P11-8, and a dental agent, namely a dental sealant, e.g. a glass-ionomer cement-based sealant or a resin-based sealant, a fluoride varnish, a dental restorative material or a bonding agent. The invention further relates to a composition and kit comprising a self-assembling peptide and a dental agent for use in the treatment of a carious lesion, preferably a cavitated carious lesion. The self-assembling peptide prevents secondary caries after failure of the dental agent used in treatment of cavitated caries, especially in case of a failing interface between the restoration with the dental agent and the tooth. The composition and kit of the present invention may also be used for pulp capping.

Figure 2:
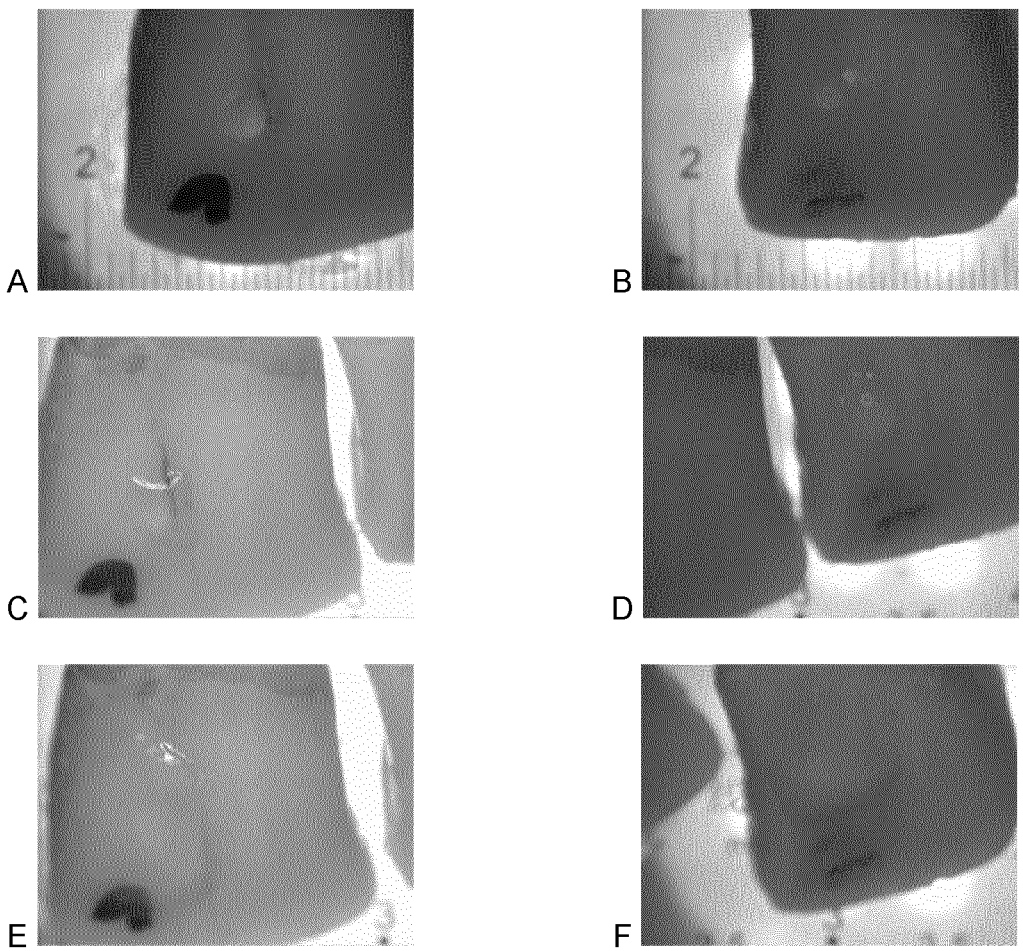

19 Claims, 5 Drawing Sheets
Specification includes a Sequence Listing.

(56) References Cited

U.S. PATENT DOCUMENTS

| | | |
|---|---|---|
| 2010/0234304 A1 | 9/2010 | Boden et al. |
| 2013/0012457 A1 | 1/2013 | Boden et al. |
| 2014/0044649 A1 | 2/2014 | Boden et al. |
| 2014/0186273 A1 | 7/2014 | Moradian-oldak et al. |
| 2017/0007737 A1 | 1/2017 | Moradian-oldak et al. |
| 2019/0153033 A1 | 5/2019 | Park et al. |

FOREIGN PATENT DOCUMENTS

| | | | | |
|---|---|---|---|---|
| WO | 00/06108 | A1 | 2/2000 | |
| WO | WO-02094204 | A1 * | 11/2002 | ............ A61K 6/033 |
| WO | 2004/007532 | A1 | 1/2004 | |
| WO | 2010/042754 | A2 | 4/2010 | |
| WO | 2014/027012 | A1 | 2/2014 | |
| WO | 2017/123986 | A1 | 7/2017 | |
| WO | WO-2018033570 | A1 * | 2/2018 | ............ A61K 38/08 |
| WO | 2018/191529 | A1 | 10/2018 | |

OTHER PUBLICATIONS

Soares, Renita, eta l., "Assessment of Enamel Remineralisation After Treatment with Four Different Remineralising Agents: A Scanning Electron Microscopy (SEM) Study," Journal of Clinical and Diagnostic Research, vol. 11, No. 4 (2017), pp. 136-141.
Slayton, Rebecca L., et al., "Evidence-based clinical practice guideline on nonrestorative treatments for carious lesions," JADA, vol. 149, No. 10 (2018), pp. 837-849.
Alkilzy, M., et al., "Treatment of Carious Lesions Using Self-Assembling Peptides," Advances in Dental Research, vol. 29, No. 1 (2018), pp. 42-47.
Barbosa-Martins, Luiz Filipe, et al., "Enhancing bond strength on demineralized dentin by pre-treatment with selective remineralising agents," Journal of Mechanical Behaviour of Biomedical Materials, vol. 81, pp. 214-221.
Braga, Mariana M., et al., "Detection Activity Assessment and Diagnosis of Dental Caries Lesions," Dent. Clin. N. Am., vol. 54 (2010), pp. 479-493.
Brunton, P.A., et al., "Treatment of early caries lesions using biomimetic self-assembling peptides—a clinical safety trial," British Dental Journal, vol. 215, E6 (2013) (6 pages).
Burke, F.J.T., et al., "The ultimate guide to restoration longevity in England and Wales. Part 3: Glass ionomer restorations—time to next intervention and to extraction of the restored tooth," British Dental Journal (2018), pp. 865-874.
Chu, C.H., et al., "A review of sodium fluoride varnish," Gen. Dent. vol. 54, No. 4 (2006) , pp. 247-253.
Dikmen, Benin, ICDAS II Criteria (International Caries Detection and Assessment System), J. Istanbul Univ. Fac. Dent., vol. 49, No. 3 (2015), pp. 63-72.
Ekstrand, KR, et al., "Detection and Activity Assessment of Primary Coronal Caries Lesions: A Methodologic Study," Operative Dentistry, vol. 32-3 (2007), pp. 225-235.
Griffin, S.O., et al., "The Effectiveness of Sealants in Managing Caries Lesions," J. Dent. Res., vol. 87, No. 2 (2008), pp. 169-174.
Hepdeniz, Ozge Kam, et al., "The effect of surface sealants with different filler content on microleakage of Class V resin composite restorations," European Journal of Denistry, Sep. 23, 2019 (7 pages).
Kind, L., et al., "Biomimetic Remineralization of Carious Lesions by Self-Assembling Peptide," Journal of Dental Research, vol. 96, No. 7 (2017), pp. 790-797.
Kirkham, J., et al., "Self-assembling Peptide Scaffolds Promote Enamel Remineralization," Journal of Dental Research, vol. 86, No. 10 (2007), pp. 426-430.
Mousavinasab, Sayed Mostafa, et al., "Fluoride Release by Glass Ionomer Cements, Compomer and Giomer," Dent. Res. J., vol. 6, No. 2 (2009), pp. 75.81.

Naaman, Reem, et al., "The Use of Pit and Fissure Sealants—A Literature Review," Dentistry Journal, vol. 5, No. 34 (2017), (19 pages).
Nedeljkovic, Ivana, et al., "Is secondary caries with composites a material-based problem?" Dental Materials, vol. BI (2015), pp. e247-e277.
Nyvad, Bente, et al., "Nyvad Criteria for Caries Lesion Activity and Severity Assessment: A Validated Approach for Clinical Management and Research," Caries Res., vol. 52 (2018), pp. 397-405.
Ruan, Qichao, et al., "An armelogenin-chitosan matrix promotes assembly of an enamal-like layer with a dense interface," Acta Biomaterialia, vol. 9 (2013), pp. 7389-7297.
Ruan, Qichao, et al., "Development of Amelogenin-chitosan Hydrogel for In Vitro Enamel Regrowth with a Dense Interface," Journal of Visualized Experiments, vol. 89 (2014) (10 pages).
Schmidlin, Patrick et al., In vitro re-hardening of artificial enamel caries lesions using enamel matrix proteins or self-assembling peptides, J. Appl. Oral Sci., vol. 24 (2016), pp. 31-36.
Sidhu, Sharanbir K., et al., "A Review of Glass-Ionomer Cements for Clinical Dentistry," Journal of Functional Biomaterials, vol. 7, No. 16 (2016), (15 pages).
Watson, Timothy F., et al., "Present and future of glass-ionomers and calcium-silicate cements as bioactive materials in dentistry: Biophotonics-based interfacial analyses in health and disease," Dental Materials, No. 30 (2014), pp. 50-61.
Galler, Kerstin M., et al., "A Customized Self-Assembling Peptide Hydrogel for Dental Pulp Tissue Engineering," Tissue Engineering: Part 1, vol. 18, Nos. 1 and 2 (2012), pp. 176-184.
De Sousa, J.P., et al., "The Self-Assembling Peptide P11-4 Prevents Collagen Proteolysis in Dentin," Journal of Dental Research, I-8 (2018) (8 pages).
First Office Action, issued by Russian Patent Office, RU Application No. 2022103145, issued Dec. 14, 2023.
Search Report, RU Application No. 202213145, issued by Russian Patent Office, Dec. 12, 2023.
Office Action issued by Japan Patent Office, JP App. No. 2022-500829, mailed Oct. 8, 2024.
Arastoo, Sara, et al., "In Vitro Microleakage Comparison of Flowable Nanocomposites and Conventional Materials Used in Pit and Fissure Sealant Therapy," Frontiers in Dentistry, vol. 16 (2019), pp. 21-30.
Barbosa-Martins, Luiz Filipe, et al., "Biomimetic Mineralizing Agents Recover the Micro Tensile Bond Strength of Demineralized Dentin," Materials, vol. 11 (2018) (14 pages).
Office Action issued by Russian Patent Office, RU App. No. 202213145, mailed May 14, 2024.
Kim, Ji Eun, et al., "Skin regeneration with self-assembled peptide hydrogels conjugated with substance P in a diabetic rat model," Tissue Engineering Part A (2018) (30 pages).
Arosio, Paolo, et al., "End-to-End Self-Assembly of RADA 16-1 Nanofibrils in Aqueous Solutions," Biophysical Journal, vol. 102 (2012), pp. 1617-1626.
International Search Report issued for PCT/Ep2020/069360, mailed Aug. 12, 2020.
Alkilzy et al., Self-assembling Peptide p. 11 -4 and Fluoride for Regenerating Enamel, Journal of Dental Research, vol. 97, No. 2, p. 148-154, 2018.
Aggeli A et al., "pH as a trigger of peptide beta-sheet self-assembly and reversible switching between nematic and isotropic phases", Journal of the American Chemical Society, vol. 125, No. 32, Aug. 13, 2003 (Aug. 13, 2003), pp. 9619-9628.
Koch F et al., "Amino acid composition of nanofibrillar self-assembling peptide hydrogels affects responses of periodontal tissue cells in vitro", Int J Nanomedicine, vol. 13, Oct. 23, 2018 (Oct. 23, 2018), pp. 6717-6733.
Koch F et al., "Mechanical characteristics of beta sheet-forming peptide hydrogels are dependent on peptide sequence, concentration and buffer composition", Royal Society open science, vol. 5, No. 3, Mar. 14, 2018 (Mar. 14, 2018), p. 171562.
Ananda SR, Mythri H. A comparative study of fluoride release from two different sealants. J Clin Exp Dent. Dec. 1, 2014;6(5):e497-501.
Koch F, Wolff A, Mathes S, Pieles U, Saxer SS, Kreikemeyer B, Peters K. Amino acid composition of nanofibrillar self-assembling

(56) References Cited

OTHER PUBLICATIONS peptide hydrogels affects responses of periodontal tissue cells in vitro. Int J Nanomedicine. Oct. 23, 2018;13:6717-6733.

* cited by examiner

Fig. 1.1
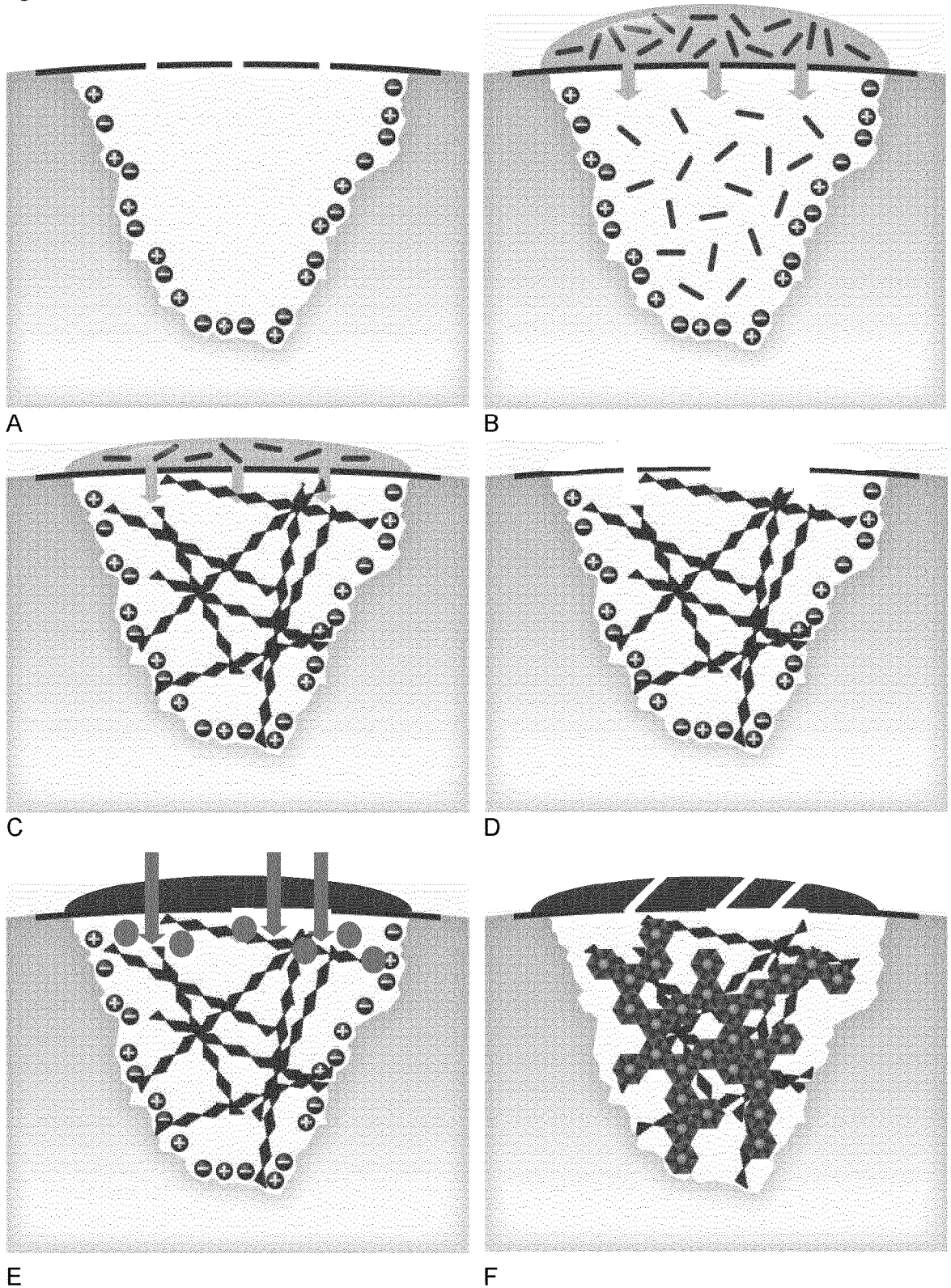

Fig. 1.2
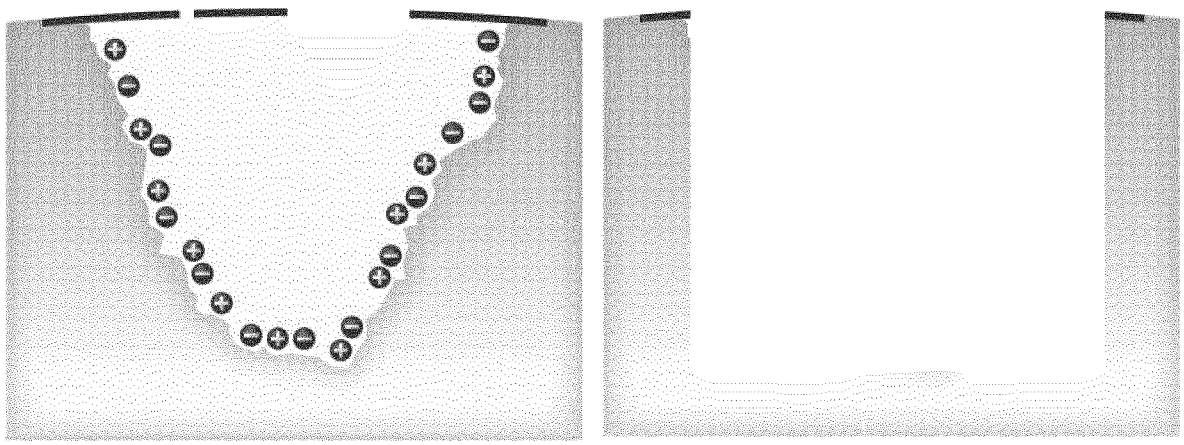
A  B
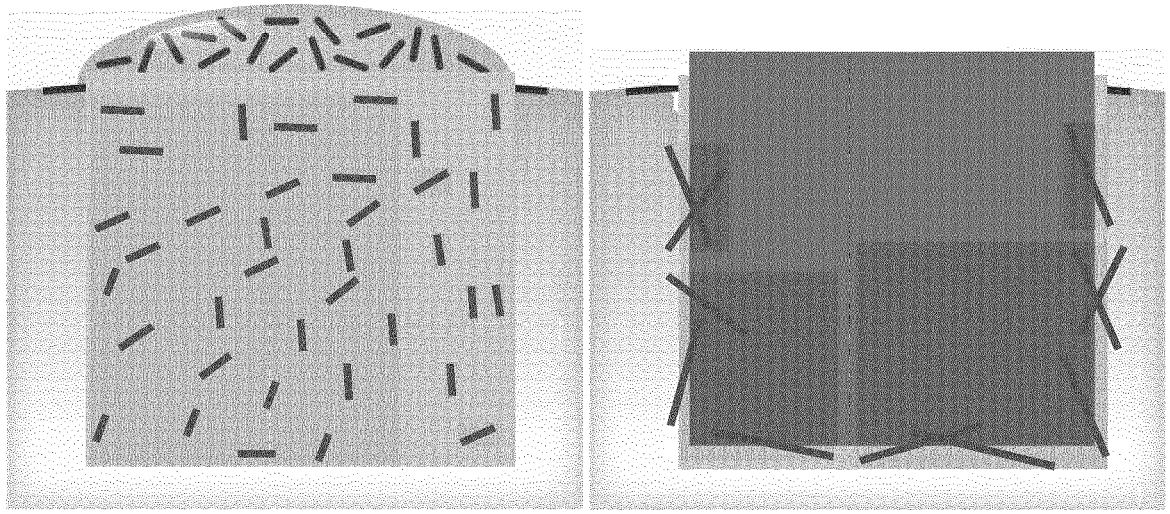
C  D
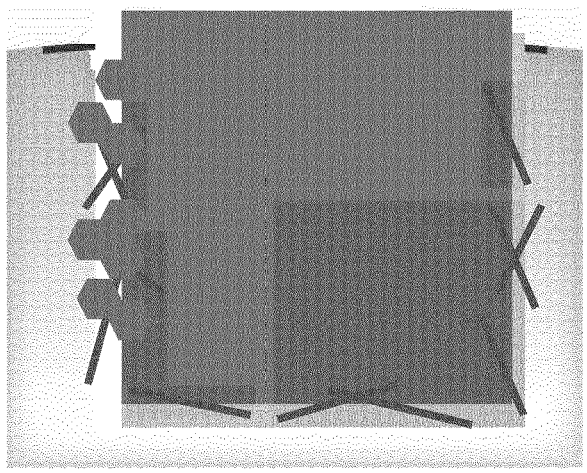
E

Fig. 4A
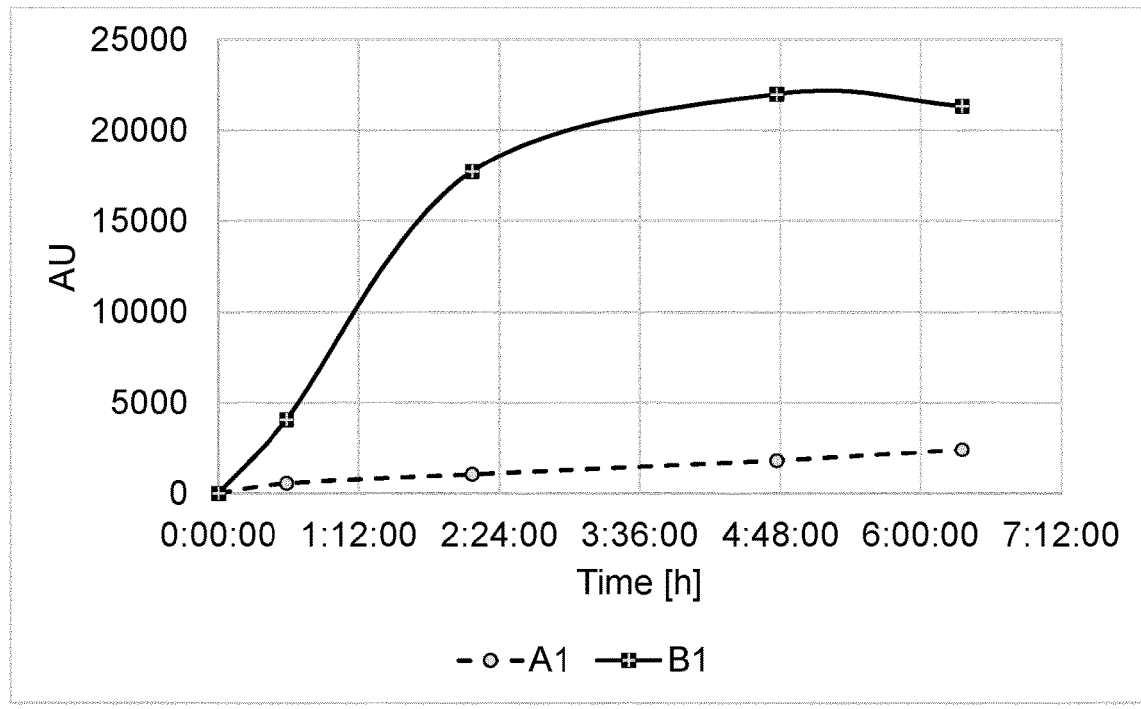
B
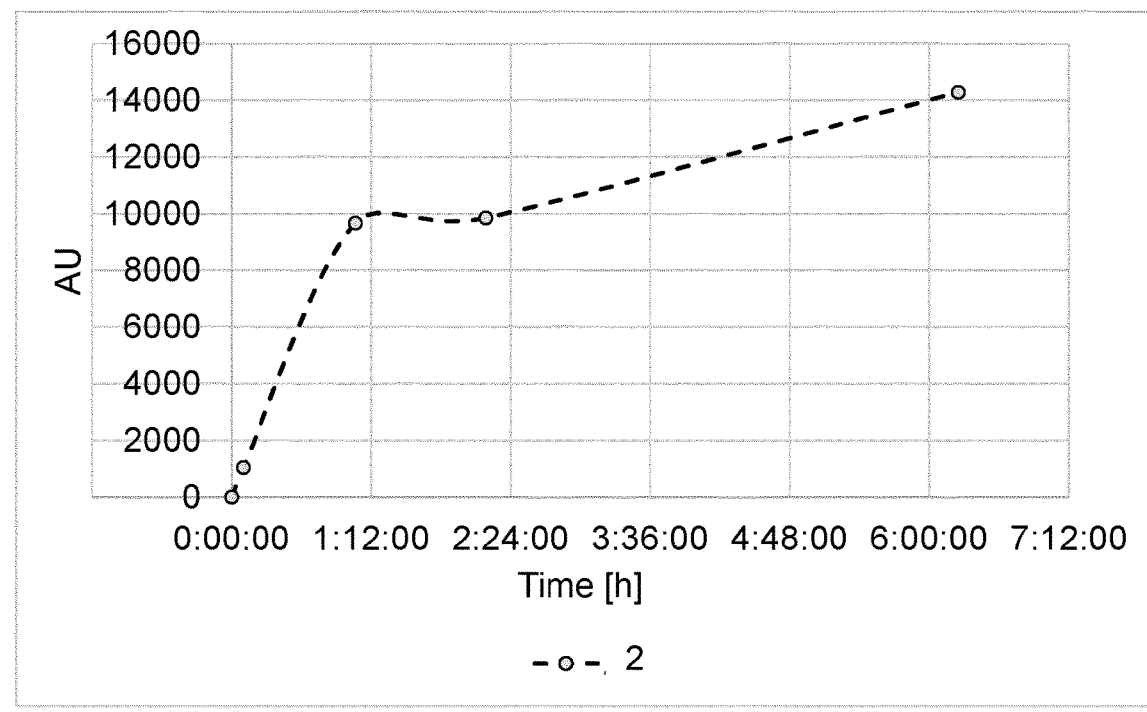

SEQUENCE LISTING

<160> NUMBER OF SEQ ID NOS: 33

<210> SEQ ID NO 1
<211> LENGTH: 5
<212> TYPE: PRT
<213> ORGANISM: Artificial Sequence
<220> FEATURE:
<223> OTHER INFORMATION: consensus sequence 1 of self-assembling
      peptides
<220> FEATURE:
<221> NAME/KEY: VARIANT
<222> LOCATION: 1..1
<223> OTHER INFORMATION: amino acid X1 is independently selected from
      the group consisting of glutamic acid, aspartic acid, glutamine
      and ornithine
<220> FEATURE:
<221> NAME/KEY: VARIANT
<222> LOCATION: 2..2
<223> OTHER INFORMATION: amino acid X2 is independently selected from
      the group consisting of alanine, valine, isoleucine, leucine,
      methionine, phenylalanine, tyrosine, tryptophan and glutamine
<220> FEATURE:
<221> NAME/KEY: VARIANT
<222> LOCATION: 3..3
<223> OTHER INFORMATION: amino acid X1 is independently selected from
      the group consisting of glutamic acid, aspartic acid, glutamine
      and ornithine
<220> FEATURE:
<221> NAME/KEY: VARIANT
<222> LOCATION: 4..4
<223> OTHER INFORMATION: amino acid X2 is independently selected from
      the group consisting of alanine, valine, isoleucine, leucine,
      methionine, phenylalanine, tyrosine, tryptophan and glutamine
<220> FEATURE:
<221> NAME/KEY: VARIANT
<222> LOCATION: 5..5
<223> OTHER INFORMATION: amino acid X1 is independently selected from
      the group consisting of glutamic acid, aspartic acid, glutamine
      and ornithine

<400> SEQUENCE: 1

Xaa Xaa Xaa Xaa Xaa
1               5

<210> SEQ ID NO 2
<211> LENGTH: 5
<212> TYPE: PRT
<213> ORGANISM: Artificial Sequence
<220> FEATURE:
<223> OTHER INFORMATION: consensus sequence 2 of self-assembling
      peptides
<220> FEATURE:
<221> NAME/KEY: VARIANT
<222> LOCATION: 1..1
<223> OTHER INFORMATION: amino acid X1 is independently selected from
      the group consisting of glutamic acid and ornithine
<220> FEATURE:
<221> NAME/KEY: VARIANT
<222> LOCATION: 2..2
<223> OTHER INFORMATION: amino acid X2 is independently selected from
      the group consisting of phenylalanine and tryptophan
<220> FEATURE:
<221> NAME/KEY: VARIANT
<222> LOCATION: 3..3
<223> OTHER INFORMATION: amino acid X1 is independently selected from
      the group consisting of glutamic acid and ornithine
<220> FEATURE:
<221> NAME/KEY: VARIANT
<222> LOCATION: 4..4
<223> OTHER INFORMATION: amino acid X2 is independently selected from
      the group consisting of phenylalanine and tryptophan
<220> FEATURE:
<221> NAME/KEY: VARIANT
<222> LOCATION: 5..5
<223> OTHER INFORMATION: amino acid X1 is independently selected from
      the group consisting of glutamic acid and ornithine -continued

```
<400> SEQUENCE: 2

Xaa Xaa Xaa Xaa Xaa
1               5

<210> SEQ ID NO 3
<211> LENGTH: 5
<212> TYPE: PRT
<213> ORGANISM: Artificial Sequence
<220> FEATURE:
<223> OTHER INFORMATION: consensus sequence 3 of self-assembling
      peptides
<220> FEATURE:
<221> NAME/KEY: VARIANT
<222> LOCATION: 1..1
<223> OTHER INFORMATION: amino acid X3 is independently selected from
      the group consisting of arginine, glutamic acid and ornithine
<220> FEATURE:
<221> NAME/KEY: VARIANT
<222> LOCATION: 3..3
<223> OTHER INFORMATION: amino acid X1 is independently selected from
      the group consisting of glutamic acid and ornithine
<220> FEATURE:
<221> NAME/KEY: VARIANT
<222> LOCATION: 5..5
<223> OTHER INFORMATION: amino acid X1 is independently selected from
      the group consisting of glutamic acid and ornithine

<400> SEQUENCE: 3

Xaa Phe Xaa Trp Xaa
1               5

<210> SEQ ID NO 4
<211> LENGTH: 11
<212> TYPE: PRT
<213> ORGANISM: Artificial Sequence
<220> FEATURE:
<223> OTHER INFORMATION: consensus sequence 4 of self-assembling
      peptides
<220> FEATURE:
<221> NAME/KEY: VARIANT
<222> LOCATION: 1..1
<223> OTHER INFORMATION: amino acid X4 is independently selected from
      the group consisting of glutamine, glutamic acid, serine,
      threonine and ornithine
<220> FEATURE:
<221> NAME/KEY: VARIANT
<222> LOCATION: 2..2
<223> OTHER INFORMATION: amino acid X4 is independently selected from
      the group consisting of glutamine, glutamic acid, serine,
      threonine and ornithine
<220> FEATURE:
<221> NAME/KEY: VARIANT
<222> LOCATION: 3..3
<223> OTHER INFORMATION: amino acid X3 is independently selected from
      the group consisting of arginine, glutamic acid and ornithine
<220> FEATURE:
<221> NAME/KEY: VARIANT
<222> LOCATION: 5..5
<223> OTHER INFORMATION: amino acid X1 is independently selected from
      the group consisting of glutamic acid and ornithine
<220> FEATURE:
<221> NAME/KEY: VARIANT
<222> LOCATION: 7..7
<223> OTHER INFORMATION: amino acid X1 is independently selected from
      the group consisting of glutamic acid and ornithine
<220> FEATURE:
<221> NAME/KEY: VARIANT
<222> LOCATION: 9..9
<223> OTHER INFORMATION: amino acid X1 is independently selected from
      the group consisting of glutamic acid and ornithine
<220> FEATURE:
<221> NAME/KEY: VARIANT
<222> LOCATION: 10..10
<223> OTHER INFORMATION: amino acid X4 is independently selected from
```

```
      the group consisting glutamine, glutamic acid, serine, threonine
      and ornithine
<220> FEATURE:
<221> NAME/KEY: VARIANT
<222> LOCATION: 11..11
<223> OTHER INFORMATION: amino acid X4 is independently selected from
      the group consisting glutamine, glutamic acid, serine, threonine
      and ornithine

<400> SEQUENCE: 4

Xaa Xaa Xaa Phe Xaa Trp Xaa Phe Xaa Xaa Xaa
1               5                   10

<210> SEQ ID NO 5
<211> LENGTH: 11
<212> TYPE: PRT
<213> ORGANISM: Artificial Sequence
<220> FEATURE:
<223> OTHER INFORMATION: consensus sequence 5 of self-assembling
      peptides
<220> FEATURE:
<221> NAME/KEY: VARIANT
<222> LOCATION: 5..5
<223> OTHER INFORMATION: amino acid X1 is independently selected from
      the group consisting of glutamic acid and ornithine
<220> FEATURE:
<221> NAME/KEY: VARIANT
<222> LOCATION: 7..7
<223> OTHER INFORMATION: amino acid X1 is independently selected from
      the group consisting of glutamic acid and ornithine
<220> FEATURE:
<221> NAME/KEY: VARIANT
<222> LOCATION: 9..9
<223> OTHER INFORMATION: amino acid X1 is independently selected from
      the group consisting of glutamic acid and ornithine

<400> SEQUENCE: 5

Gln Gln Arg Phe Xaa Trp Xaa Phe Xaa Gln Gln
1               5                   10

<210> SEQ ID NO 6
<211> LENGTH: 11
<212> TYPE: PRT
<213> ORGANISM: Artificial Sequence
<220> FEATURE:
<223> OTHER INFORMATION: P11-4

<400> SEQUENCE: 6

Gln Gln Arg Phe Glu Trp Glu Phe Glu Gln Gln
1               5                   10

<210> SEQ ID NO 7
<211> LENGTH: 11
<212> TYPE: PRT
<213> ORGANISM: Artificial Sequence
<220> FEATURE:
<223> OTHER INFORMATION: P11-2

<400> SEQUENCE: 7

Gln Gln Arg Phe Gln Trp Gln Phe Glu Gln Gln
1               5                   10

<210> SEQ ID NO 8
<211> LENGTH: 11
<212> TYPE: PRT
<213> ORGANISM: Artificial Sequence
<220> FEATURE:
<223> OTHER INFORMATION: P11-5
<220> FEATURE:
<221> NAME/KEY: MOD_RES
<222> LOCATION: 5..5
```

```
<223> OTHER INFORMATION: ornithine
<220> FEATURE:
<221> NAME/KEY: MOD_RES
<222> LOCATION: 7..7
<223> OTHER INFORMATION: ornithine

<400> SEQUENCE: 8

Gln Gln Arg Phe Xaa Trp Xaa Phe Gln Gln Gln
1               5                   10

<210> SEQ ID NO 9
<211> LENGTH: 11
<212> TYPE: PRT
<213> ORGANISM: Artificial Sequence
<220> FEATURE:
<223> OTHER INFORMATION: P11-8
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine

<400> SEQUENCE: 9

Gln Gln Arg Phe Xaa Trp Xaa Phe Glu Gln Gln
1               5                   10

<210> SEQ ID NO 10
<211> LENGTH: 11
<212> TYPE: PRT
<213> ORGANISM: Artificial Sequence
<220> FEATURE:
<223> OTHER INFORMATION: P11-12
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine

<400> SEQUENCE: 10

Ser Ser Arg Phe Xaa Trp Xaa Phe Glu Ser Ser
1               5                   10

<210> SEQ ID NO 11
<211> LENGTH: 11
<212> TYPE: PRT
<213> ORGANISM: Artificial Sequence
<220> FEATURE:
<223> OTHER INFORMATION: P11-13

<400> SEQUENCE: 11

Glu Gln Glu Phe Glu Trp Glu Phe Glu Gln Glu
1               5                   10

<210> SEQ ID NO 12
<211> LENGTH: 11
<212> TYPE: PRT
<213> ORGANISM: Artificial Sequence
<220> FEATURE:
<223> OTHER INFORMATION: P11-14
<220> FEATURE:
<221> NAME/KEY: MOD_RES
<222> LOCATION: 3..3
<223> OTHER INFORMATION: ornithine
<220> FEATURE:
<221> NAME/KEY: MOD_RES
```

```
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 9..9
<223> OTHER INFORMATION: ornithine

<400> SEQUENCE: 12

Gln Gln Xaa Phe Xaa Trp Xaa Phe Xaa Gln Gln
1               5                   10

<210> SEQ ID NO 13
<211> LENGTH: 11
<212> TYPE: PRT
<213> ORGANISM: Artificial Sequence
<220> FEATURE:
<223> OTHER INFORMATION: P11-17

<400> SEQUENCE: 13

Thr Thr Arg Phe Glu Trp Glu Phe Glu Thr Thr
1               5                   10

<210> SEQ ID NO 14
<211> LENGTH: 11
<212> TYPE: PRT
<213> ORGANISM: Artificial Sequence
<220> FEATURE:
<223> OTHER INFORMATION: P11-19
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine

<400> SEQUENCE: 14

Gln Gln Arg Gln Xaa Gln Xaa Gln Glu Gln Gln
1               5                   10

<210> SEQ ID NO 15
<211> LENGTH: 11
<212> TYPE: PRT
<213> ORGANISM: Artificial Sequence
<220> FEATURE:
<223> OTHER INFORMATION: P11-20

<400> SEQUENCE: 15

Gln Gln Arg Gln Glu Gln Glu Gln Glu Gln Gln
1               5                   10

<210> SEQ ID NO 16
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ornithine
<220> FEATURE:
<223> OTHER INFORMATION: P11-28
<220> FEATURE:
<221> NAME/KEY: MOD_RES
<222> LOCATION: 3..3
<223> OTHER INFORMATION: ornithine
<220> FEATURE:
```

```
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 9..9
<223> OTHER INFORMATION: ornithine
<220> FEATURE:
<221> NAME/KEY: MOD_RES
<222> LOCATION: 11..11
<223> OTHER INFORMATION: ornithine

<400> SEQUENCE: 16

Xaa Gln Xaa Phe Xaa Trp Xaa Phe Xaa Gln Xaa
1               5                   10

<210> SEQ ID NO 17
<211> LENGTH: 11
<212> TYPE: PRT
<213> ORGANISM: Artificial Sequence
<220> FEATURE:
<223> OTHER INFORMATION: P11-29

<400> SEQUENCE: 17

Gln Gln Glu Phe Glu Trp Glu Phe Glu Gln Gln
1               5                   10

<210> SEQ ID NO 18
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-4mod
<220> FEATURE:
<221> NAME/KEY: MOD_RES
<222> LOCATION: 11..11
<223> OTHER INFORMATION: AMIDATION

<400> SEQUENCE: 18

Gln Gln Arg Phe Glu Trp Glu Phe Glu Gln Gln
1               5                   10

<210> SEQ ID NO 19
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-2mod
<220> FEATURE:
<221> NAME/KEY: MOD_RES
<222> LOCATION: 11..11
<223> OTHER INFORMATION: AMIDATION

<400> SEQUENCE: 19

Gln Gln Arg Phe Gln Trp Gln Phe Glu Gln Gln
1               5                   10

<210> SEQ ID NO 20
<211> LENGTH: 11
```

```
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-5mod
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 11..11
<223> OTHER INFORMATION: AMIDATION

<400> SEQUENCE: 20

Gln Gln Arg Phe Xaa Trp Xaa Phe Gln Gln Gln
1               5                   10

<210> SEQ ID NO 21
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-8mod
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 11..11
<223> OTHER INFORMATION: AMIDATION

<400> SEQUENCE: 21

Gln Gln Arg Phe Xaa Trp Xaa Phe Glu Gln Gln
1               5                   10

<210> SEQ ID NO 22
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-12mod
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 11..11
<223> OTHER INFORMATION: AMIDATION
```

```
<400> SEQUENCE: 22

Ser Ser Arg Phe Xaa Trp Xaa Phe Glu Ser Ser
1               5                   10

<210> SEQ ID NO 23
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-13mod
<220> FEATURE:
<221> NAME/KEY: MOD_RES
<222> LOCATION: 11..11
<223> OTHER INFORMATION: AMIDATION

<400> SEQUENCE: 23

Glu Gln Glu Phe Glu Trp Glu Phe Glu Gln Glu
1               5                   10

<210> SEQ ID NO 24
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-14mod
<220> FEATURE:
<221> NAME/KEY: MOD_RES
<222> LOCATION: 3..3
<223> OTHER INFORMATION: ornithine
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 9..9
<223> OTHER INFORMATION: ornithine
<220> FEATURE:
<221> NAME/KEY: MOD_RES
<222> LOCATION: 11..11
<223> OTHER INFORMATION: AMIDATION

<400> SEQUENCE: 24

Gln Gln Xaa Phe Xaa Trp Xaa Phe Xaa Gln Gln
1               5                   10

<210> SEQ ID NO 25
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-17mod
<220> FEATURE:
<221> NAME/KEY: MOD_RES
<222> LOCATION: 11..11
<223> OTHER INFORMATION: AMIDATION
```

```
<400> SEQUENCE: 25

Thr Thr Arg Phe Glu Trp Glu Phe Glu Thr Thr
1               5                   10

<210> SEQ ID NO 26
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-19mod
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 11..11
<223> OTHER INFORMATION: AMIDATION

<400> SEQUENCE: 26

Gln Gln Arg Gln Xaa Gln Xaa Gln Glu Gln Gln
1               5                   10

<210> SEQ ID NO 27
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-20mod
<220> FEATURE:
<221> NAME/KEY: MOD_RES
<222> LOCATION: 11..11
<223> OTHER INFORMATION: AMIDATION

<400> SEQUENCE: 27

Gln Gln Arg Gln Glu Gln Glu Gln Glu Gln Gln
1               5                   10

<210> SEQ ID NO 28
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<221> NAME/KEY: MOD_RES
<222> LOCATION: 1..1
<223> OTHER INFORMATION: ornithine
<220> FEATURE:
<223> OTHER INFORMATION: P11-28mod
<220> FEATURE:
<221> NAME/KEY: MOD_RES
<222> LOCATION: 3..3
<223> OTHER INFORMATION: ornithine
<220> FEATURE:
<221> NAME/KEY: MOD_RES
<222> LOCATION: 5..5
<223> OTHER INFORMATION: ornithine
<220> FEATURE:
```

```
<221> NAME/KEY: MOD_RES
<222> LOCATION: 7..7
<223> OTHER INFORMATION: ornithine
<220> FEATURE:
<221> NAME/KEY: MOD_RES
<222> LOCATION: 9..9
<223> OTHER INFORMATION: ornithine
<220> FEATURE:
<221> NAME/KEY: MOD_RES
<222> LOCATION: 11..11
<223> OTHER INFORMATION: ornithine
<220> FEATURE:
<221> NAME/KEY: MOD_RES
<222> LOCATION: 11..11
<223> OTHER INFORMATION: AMIDATION

<400> SEQUENCE: 28

Xaa Gln Xaa Phe Xaa Trp Xaa Phe Xaa Gln Xaa
1               5                   10

<210> SEQ ID NO 29
<211> LENGTH: 11
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: P11-29mod
<220> FEATURE:
<221> NAME/KEY: MOD_RES
<222> LOCATION: 11..11
<223> OTHER INFORMATION: AMIDATION

<400> SEQUENCE: 29

Gln Gln Glu Phe Glu Trp Glu Phe Glu Gln Gln
1               5                   10

<210> SEQ ID NO 30
<211> LENGTH: 11
<212> TYPE: PRT
<213> ORGANISM: Artificial Sequence
<220> FEATURE:
<223> OTHER INFORMATION: P11-16
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7
<223> OTHER INFORMATION: ornithine

<400> SEQUENCE: 30

Asn Asn Arg Phe Xaa Trp Xaa Phe Glu Asn Asn
1               5                   10

<210> SEQ ID NO 31
<211> LENGTH: 11
<212> TYPE: PRT
<213> ORGANISM: Artificial Sequence
<220> FEATURE:
<223> OTHER INFORMATION: P11-18
<220> FEATURE:
<221> NAME/KEY: MOD_RES
<222> LOCATION: 5..5
<223> OTHER INFORMATION: ornithine
<220> FEATURE:
<221> NAME/KEY: MOD_RES
<222> LOCATION: 7
<223> OTHER INFORMATION: ornithine
```

```
<400> SEQUENCE: 31

Thr Thr Arg Phe Xaa Trp Xaa Phe Glu Thr Thr
1               5                   10

<210> SEQ ID NO 32
<211> LENGTH: 11
<212> TYPE: PRT
<213> ORGANISM: Artificial Sequence
<220> FEATURE:
<223> OTHER INFORMATION: P11-26
<220> FEATURE:
<221> NAME/KEY: MOD_RES
<222> LOCATION: 3
<223> OTHER INFORMATION: ornithine
<220> FEATURE:
<221> NAME/KEY: MOD_RES
<222> LOCATION: 5
<223> OTHER INFORMATION: ornithine
<220> FEATURE:
<221> NAME/KEY: MOD_RES
<222> LOCATION: 7
<223> OTHER INFORMATION: ornithine
<220> FEATURE:
<221> NAME/KEY: MOD_RES
<222> LOCATION: 9
<223> OTHER INFORMATION: ornithine

<400> SEQUENCE: 32

Gln Gln Xaa Gln Xaa Gln Xaa Gln Xaa Gln Gln
1               5                   10

<210> SEQ ID NO 33
<211> LENGTH: 11
<212> TYPE: PRT
<213> ORGANISM: Artificial Sequence
<220> FEATURE:
<223> OTHER INFORMATION: P11-31
<220> FEATURE:
<221> NAME/KEY: MOD_RES
<222> LOCATION: 3
<223> OTHER INFORMATION: ornithine
<220> FEATURE:
<221> NAME/KEY: MOD_RES
<222> LOCATION: 5
<223> OTHER INFORMATION: ornithine
<220> FEATURE:
<221> NAME/KEY: MOD_RES
<222> LOCATION: 7
<223> OTHER INFORMATION: ornithine
<220> FEATURE:
<221> NAME/KEY: MOD_RES
<222> LOCATION: 9
<223> OTHER INFORMATION: ornithine

<400> SEQUENCE: 33

Ser Ser Xaa Phe Xaa Trp Xaa Phe Xaa Ser Ser
1               5                   10
```

SELF-ASSEMBLING PEPTIDES IN THE PREVENTION AND TREATMENT OF CAVITATED CARIOUS LESIONS

CROSS-REFERENCE TO RELATED APPLICATIONS

This application is a National Stage of International Application No. PCT/EP2020/069360, filed Jul. 9, 2020, which claims the benefit of European Provisional Application No. EP19185523.8, filed Jul. 10, 2019, which are hereby incorporated herein by reference in their entireties.

SEQUENCE LISTING

This application contains a sequence listing filed in ST.26 format entitled "11753_Sequence listing.txt" created on Nov. 23, 2021, and having a file size of 14,000 bytes. The content of the sequence listing is incorporated herein in its entirety.

DETAILED DESCRIPTION

The invention is in the field of caries treatment, in particular minimally-invasive, or noninvasive dental decay treatment. It relates to a composition and a kit comprising a self-assembling peptide, such as the self-assembling peptide P11-4 or P11-8, and a dental agent, namely a dental sealant, e.g. cement-based sealant such as a glass-ionomer cement-based sealant, or a resin-based sealant, a fluoride varnish or a bonding agent or another dental restorative material. The invention further relates to a composition and kit comprising a self-assembling peptide and a dental agent for use in the treatment of a carious lesion, preferably a cavitated carious lesion. Caries lesions can be primary or secondary caries. Primary caries is not associated with a previous restoration. In contrast, secondary caries is defined as a lesion associated with dental restorations or sealants. In the context of the invention, the self-assembling peptide prevents secondary caries after failure of the dental agent used in treatment of cavitated caries, especially in case of a failing interface between the restoration with the dental agent and the tooth. The composition and kit of the present invention may also be used for pulp capping.

Tooth decay, also known as dental caries, is one of the most ubiquitous bacterial infections in the world. It is a breakdown of tooth material due to bacterial metabolites, mainly acids made by bacteria when they break down food debris or sugar on the surface or in the biofilm of the teeth. This leads to an imbalance between demineralisation and remineralisation processes. Hard tooth structures, i.e., enamel, dentin and cementum, are damaged by ongoing demineralisation, which results in carious lesions and eventually in the appearance of caries cavities. The earliest sign of a new carious lesion is the appearance of a chalky white spot on the surface of the tooth, a so-called white spot lesion (also designated an incipient carious lesion), i.e. a subsurface lesion. As the demineralisation progresses, the mineralised surface of the lesion (partially) collapses and breaks and a microcavity or a cavity, a hole in the tooth, appears. This is referred to as a (partially) cavitated carious lesion or cavitated carious lesion.

Caries preventative approaches including topical fluoride therapy and application of dental sealants, also known as pit and fissure sealants, have been described. Sealant application involves the introduction of sealants into pits and/or fissures of caries prone teeth. The predominant types of sealant materials on the market at present are resin-based sealants and glass-ionomer cement-based sealants (Naaman et al., 2017, Dent J., 5, 34). The property of fluoride release is considered one of the advantages of glass-ionomer cements (Sidhu and Nicholson, 2016, J Funct Biomater., 7, 16), which thus combine the remineralising effect of fluoride and the protective effect of sealants on pits and fissures.

To date, the treatment of caries usually depends on whether the carious lesion is cavitated or non-cavitated. Non-invasive approaches have been suggested for non-cavitated carious lesions, i.e. subsurface lesions. For example, remineralisation is attempted by the application of topical fluoride.

Furthermore, enamel matrix derivatives or self-assembling peptides have been shown to be effective in the remineralisation of subsurface carious lesions (Ruan et al., 2013. Acta Biomater. 9(7):7289-97; Ruan et al., 2014. J Vis Exp. 10(89), doi 10.379151606; Schmidlin et al., 2016, J Appl Oral Sci. 24(1), 31-36; Alkilzy et al., 2018, Adv Dent Res. 29(1), 42-47; Brunton et al., 2013, Br Dent J, 215:E6; Kind et al., 2017, J Dent Res., 96(7), 790-797; Kirkham et al., 2007, J Dent Res., 86, 426-430). In WO 2014/027012 A1, a method for the targeted delivery of a self-assembling peptide to a subsurface tooth lesion with the aim of remineralising carious lesions is described. Alkilzy et al. (2018, above) found an additional effect of the application of P11-4, a self-assembling peptide, to early carious lesions, in combination with fluoride, compared to the application of fluoride alone.

Amelogenin-based biomineralisation approaches for tooth repair have been described in the context of dentinal hypersensitivity, whitening or bleaching of teeth, and the treatment of caries in WO 2017/123986 A1, US 2014/0186273 A1 and US 2017/0007737 A1.

In WO 2017/168183 A1, a biomimetic mineralised apatite structure based on elastin-like peptides is described for use as dental restorative material, in particular for the reconstruction of enamel, and for use in the treatment of dental diseases such as dental caries.

Furthermore, casein-based strategies have been developed for remineralisation of enamel and prevention and/or treatment of caries or tooth erosion (e.g. WO 00/06108 A1 and WO 2010/042754 A2). Casein phosphopeptide amorphous calcium phosphate complexes (CPPACP) and CPP-stabilised amorphous calcium fluoride phosphate complexes have been described in combination with glass-ionomer cement as remineralising dental restorative materials, e.g., in WO 02/094204 A1. Some studies have also shown that caries progression is slowed or arrested under sealants when applied to non-cavitated carious lesions (Griffin S. O. et al., 2008, J Dent Res., 87(2), 169-174).

Once a carious lesion has cavitated and a hole in the tooth appears, the common treatment applied to date is invasive, since remineralisation at this stage is much more difficult than for non-cavitated carious lesions. The decayed material is usually removed by using, for example, a dental handpiece ("drill"). Alternatively, a laser, a dental spoon or a chemomechanical system may be used to remove dental caries.

After removal (i.e. excavation) of the carious enamel, the missing tooth structure requires a dental restoration using dental restorative materials such as sealants, amalgam, dental composites, porcelain or gold. This conventional invasive treatment of cavitated caries is associated with several disadvantages.

First of all, the natural tooth structure is severely damaged, since healthy tooth material is also removed during the process of removing decayed dental material. The process of removing caries material is typically associated with pain and anxiety, which usually has to be relieved by the application of local anaesthetics. Additionally, by the removal of carious enamel, the adjacent tooth structure is affected.

Furthermore, restorations, in particular with sealants or composites, often fail, and the filling will eventually have to be redone, resulting in further loss of tooth structure. Failure may be caused by existence or formation of gaps between the tooth and the restoration and/or the sealant falling off partly or completely. Such failure is often associated with secondary caries (also named recurrent caries or CARS (caries adjacent to restorations and sealants)). The site of a filling serves as vulnerable site for further decay (Burke and Lucarotti 2018. The ultimate guide to restoration longevity in England and Wales. Part 3: Glass ionomer restorations-time to next intervention and to extraction of the restored tooth. Br Dent J. 224(10):789-800; Nedeljkovic et al., 2015. Dental Materials 31(11):e247-e277).

Thus, there is a need for improved treatment of cavitated caries overcoming at least some of the disadvantages of the prior art methods, in particular, preventing the development of secondary caries. This problem is solved by the present invention, in particular, the subject matter of the claims. The inventors of the present invention surprisingly found that self-assembling peptides can be effectively used in combination with conventional dental agents, namely a dental sealant, e.g. a glass-ionomer cement, a fluoride varnish or a bonding agent, for advantageous treatment of cavitated carious lesions.

The present invention thus relates to a composition comprising (a) a self-assembling peptide, and (b) a dental agent selected from the group consisting of a dental restorative material such as a dental sealant, a fluoride varnish and a bonding agent, wherein preferably the dental agent is a dental sealant, e.g., a cement-based sealant, most preferably, a glass-ionomer based sealant. The composition may be a pharmaceutical composition.

Preferably, in the composition of the invention, the self-assembling peptide and the dental agent are in homogenously mixed form. "Homogenously mixed" means that the composition is a consistent mixture of its components. Thus, the composition according to the present invention preferably has essentially the same proportions of its components throughout any given sample.

Furthermore, the present invention provides a kit comprising (a) a self-assembling peptide, and (b) a dental agent wherein the dental agent is a glass-ionomer based sealant. The kit may be a pharmaceutical kit.

The kit comprises the components of the composition according to the present invention in separate form, e.g., in separate vials, flasks, syringes, applicators or other containers. In the kit according to the present invention, the self-assembling peptide may be comprised in a composition which may further comprise a solvent such as water and/or a buffer. Non polar or polar organic solvents may alternatively be used. In the context of the invention, unless stated otherwise, "a" is interpreted to mean "one or more". The kit may also comprise further components, e.g., more than one of the dental agents defined herein. For example, the kit may comprise, in addition to the self-assembling peptide, a composite and a bonding agent suitable for bonding the composite. Further optional components are, e.g., an etching agent and/or a buffer capable or proving calcium, fluoride and/or phosphate.

The kit according to the present invention may comprise (a) a composition comprising a self-assembling peptide, and (b) at least one dental agent as defined herein, wherein the composition and the dental agent are in separate form. Alternatively, the self-assembling peptide and the solvent such as water may be in separate form, e.g., in separate compartments of an application device (e.g., as commercially available for Curodont® Repair, credentis AG, Windisch, CH). The self-assembling peptide may be in dried, buffered form, as disclosed in WO 2014/027012.

A composition or kit comprising a self-assembling peptide means that the composition may contain a single type of self-assembling peptides or two or more, such as three, four or five etc., different types of self-assembling peptides. For example, as described in detail below, the composition may contain two complementary peptides which self-assemble in combination.

The term "comprising" as used herein encompasses the meaning "consisting of".

The present invention further provides a composition or a kit comprising (a) a self-assembling peptide, and (b) a dental agent as defined herein, for use in the treatment of a carious lesion. The carious lesion preferably is a cavitated carious lesion, more preferably an active carious lesion, such as an active cavitated carious lesion, wherein the composition or kit preferably is a composition or kit according to the present invention, such as a kit comprising a self-assembling peptide and a dental sealant.

The invention also provides a composition or kit comprising (a) a self-assembling peptide, and (b) a dental agent selected from the group consisting of a dental sealant, a fluoride varnish, and a dental bonding agent for use in preventing secondary caries after failure of the dental agent in treatment of a cavitated carious lesion. Preferably, the dental agent is a dental sealant, preferably, a glass-ionomer cement based sealant.

In the context of the present invention, the term "carious lesion" (or "caries lesion") refers to the localized destruction of dental hard tissues by acidic by-products from the bacterial fermentation of dietary carbohydrates. Caries can be defined as a microbial disease of the calcified tissues of teeth characterized by demineralisation of the inorganic portion and destruction of organic substances of the tooth. The term includes, e.g., enamel caries, cement caries and dentin caries. In the context of the invention, the lesions treated are typically carious enamel lesions. Carious lesions may be subdivided into non-cavitated or subsurface carious lesions and cavitated carious lesions. The carious lesions treated in the invention may be primary or secondary carious lesions.

A "cavitated carious lesion" refers to a carious lesion which resulted in the tooth surface not being intact, i.e., an at least a partial breakdown of the surface of tooth structure in the area of the carious lesion, e.g., a hole, is present, for example, a localized enamel breakdown.

There are indices used in dentistry for scoring the severity and activity of carious lesions. In the context of the present invention, the clinical scoring system ICDAS (International Caries Detection and Assessment System) is preferably used, preferably the ICDAS-II system. Information on scoring and activity criteria of carious lesions according to ICDAS-II can be found, for example, in Dikmen (2015, J Istanbul Univ Fac Dent 49(3):63-72) or under www.icdas.org. As an overview, ICDAS-II stages describe dental status as follows: ICDAS-II stage 0: sound; ICDAS-II stage 1: first visual change in enamel; ICDAS-II stage 2: distinct visual change in enamel; ICDAS-II stage 3: localized enamel breakdown (without clinical visual signs of dentinal involvement); ICDAS-II stage 4: underlying dark shadow from dentin; ICDAS-II stage 5: distinct cavity with visible dentin; ICDAS-II stage 6: extensive distinct cavity with visible dentin. The ICDAS system is also used for lesion activity assessment (LAA), which is typically based on the combined knowledge of clinical appearance of the lesion, whether or not the lesion is in a plaque stagnation area, and the tactile sensation when a ball-ended WHO probe is gently drawn across the surface of the tooth. Further information on LAA may, for example, be found in Ekstrand et al. (2007, Oper Dent. 32(3):225-235) or Nyvad et al., 2018. Caries Res. 52(5):397-405).

In a preferred embodiment, the composition or the kit for use according to the present invention is for use in the treatment of a carious lesion of ICDAS-II stage 3-6, such as ICDAS-II stage 3, ICDAS-II stage 4, ICDAS-II stage 5 or ICDAS-II stage 6, preferably stages 3-5, even more preferably ICDAS-II stages 3-4. Preferably, the carious lesion is an active carious lesion.

Detection and assessment of a carious lesion may be performed by conventional caries detection and assessment methods. For example, visual examination, e.g., aided by a probe such as a ball-ended probe, or radiographic methods or a combination thereof are widely used. In the context of the present invention, a "cavitated carious lesion" may be a carious lesion which is detectable by a ball-ended probe, such as a probe which is ball-ended with a sphere exhibiting 0.5 mm diameter (e.g. a WHO probe). Information on diagnosis and assessment of dental carious lesions can be found, for example, in Braga et al. (2010, Dent Clin N Am 54:479-493).

Thus, for example, the present invention provides a composition comprising (a) a self-assembling peptide, and (b) a dental agent as defined herein for use in the treatment of a carious lesion, e.g., of ICDAS-II stage 1, 2, 3, 4, or 5, preferably a cavitated carious lesion, more preferably a carious lesion of ICDAS-II stage 3, 4, or 5, even more preferably a carious lesion of ICDAS-II stage 3 or 4. Furthermore, the present invention provides, for example, a kit comprising (a) a self-assembling peptide, and (b) a glass-ionomer cement-based dental sealant for use in the treatment of a cavitated carious lesion, i.e., a carious lesion of ICDAS-II stage 3, 4, 5, or 6, more preferably a carious lesion of ICDAS-II stage 3, 4, or 5, even more preferably a carious lesion of ICDAS-II stage 3 or 4, wherein, preferably, the carious lesion is active.

Preventing secondary caries after failure of the dental agent in treatment of a cavitated carious lesion means reducing the incidence of secondary caries. Secondary caries typically forms under or at the margins of restorations. Failure of the dental agent can be existence or formation of gaps between the dental agent used for restoration of the cavitated carious lesion (partial failure). It can also be the dental agent or the restoration wearing off or falling off either partially or completely (complete failure). In one embodiment, the treatment as described herein does not only reduce the incidence of secondary caries after failure of the dental agent, but it also increases the time until partial or complete failure of the dental agent, because, secondary caries e.g., in the margins of a restoration can also cause such failure. This is however not necessary, and it is sufficient that secondary caries after partial or complete failure of a dental agent is prevented.

Restorations classically made with the dental agents defined herein typically fail after relatively short times, which is, in the state of the art, often associated with secondary caries. For example, a fluoride varnish is typically retained for up to 3 days under conditions present in the oral cavity, including wear by chewing. In protected areas, the varnish can also be maintained longer. Sealants, e.g., glass-ionomer based cement sealants typically slowly fail in the course of 2-10 years. Bonding agents are typically used for bonding a restoration such as a composite or crown to a tooth surface. Failure of the bonding agent and the restoration are typically linked. The time period until failure of the dental agent also depends on several factors in addition to the material, namely, the patient (e.g., a history of extensive dental treatment is associated with high failure rates), hygiene, the technical proficiency of the dental practitioner, the location etc.

In the context of the invention, the inventors found that the combination of the dental agent with a self-assembling peptide prevents secondary caries, because upon failure of the dental agent, e.g., formation of a gap between a restoration with the dental agent or wearing/falling off of the dental agent or a restoration bonded to the tooth with a dental agent, a matrix formed by the self-assembling peptide, which allows for remineralisation, protects the tooth from development of secondary caries. Remineralisation of a matrix formed by the self-assembling peptide may already be induced when the tooth (i.e., the cavity) is contacted with self-assembling peptide, and, depending on the availability of ions (e.g., derived from the dental material and/or saliva), under cover of the dental material. In any case, upon failure of the dental material, e.g., when a gap between the material and the tooth forms, the matrix formed by the self-assembling peptides can be remineralised and protects the tooth from secondary caries. Self-assembling peptide can also assemble around the margins of a restoration with the dental material, and protect these sites, which are also highly vulnerable to development of secondary caries.

If the self-assembling peptide and the dental agent are mixed, the dental agent may further serve as a delayed release reservoir of self-assembling peptide.

Pre-treatment with self-assembling peptides has been used to increase bond-strength on demineralized dentin (Barbosa-Martins et al., 2018. J Mech Behav Biomed Mater 81:214-221). It is known in the art that bonding of restorations, in particular, of composites to dentine is problematic, because, in comparison to enamel, collagen is present as an organic component and the water content of dentine is much higher and the concentration of ions much lower than in enamel. Barbosa-Martins et al. tested if pretreatment with self-assembling peptides increased the bond for two adhesive systems, Adper Single Bond (SB) and Clearfil SE Bond (CSE). Both agents are resin-based composites. Advantages were found for the bond with SB, but not for CSE. This is discussed to be due to the fact that SB requires etching with phosphoric acid, which is believed to enhance assembly of the self-assembling peptide. In contrast, CSE is a self-etch system, which lowers the pH much less. Due to the significant differences between dentin and enamel surfaces, this publication only allows for conclusions for dentin lesions, not for enamel lesions. Lesions in enamel are preferred throughout the invention. The publication also provides no indications if the results also apply to dental agents other than composites. In one embodiment of the invention, the dental agent is not a resin-based composite. Indeed, other dental agents, such as glass-ionomer cement based dental sealants, have advantageous properties in combination with self-assembling peptides, as described herein.

Dental agents as defined herein are well-known to the person skilled in the art, and they are typically commercially available. Dental agents include dental sealants, dental varnishes, such as fluoride varnishes, and dental bonding agents. Thus, the present invention provides a composition or a kit comprising (a) a self-assembling peptide, and (b) a dental agent selected from the group consisting of dental restorative materials such as dental sealants, dental varnishes, and dental bonding agents (in case of a kit, a glass-ionomer cement based sealant), preferably for use in the treatment of a carious lesion of ICDAS-II stage 1-6, more preferably for use in the treatment of a cavitated carious lesion, such as a carious lesion of ICDAS-II stage 3, 4 or 5, as described above, in particular, for use in preventing secondary caries.

The dental agent used in the present invention may comprise an acidic polymer selected from the group comprising an acrylate and methacrylate, ionomer, giomer, Ormocer® and any other suitable polymer and/or a monomeric form thereof. Preferably, the dental agent comprises components which are capable of polymerizing, for example, in a cavitated carious lesion or before being filled into such lesion. Thus, components of the dental agent may initially be in monomeric form and may form a restoration (in particular, in case of a sealant) or a protective layer (in particular, in case of a varnish) or be used for bonding a restoration (in particular, in case of a bonding agent) upon polymerization of said monomeric components. The dental agent may be a material suitable for curing with visible light, an auto-polymerizing material, or a material suitable for curing with UV light, preferably, a material suitable for curing with visible light.

In one embodiment of the present invention, the dental agent is a dental varnish, such as a fluoride varnish. Fluoride varnishes are well-known to the person skilled in the art and are commercially available. A conventional fluoride varnish generally comprises fluoride as a salt or silane preparation in a high concentration in an adhesive solution, such as in a fast drying alcohol and resin-based solution. The concentration, form of fluoride and dispensing method varies depending on the manufacturer. Typical concentrations are 2.5% to 5% sodium fluoride or about 1% difluorsilane, for example, in a polyurethane, polyacrylate, colophonium or shellac base. Varnishes may comprise CPP-ACP, such as MI Varnish (GC, Japan). Further suitable fluoride varnishes include, for example, Durophat® Suspension (Gaba Schweiz AG), Profluoride Varnish and Bifluorid 12 (Voco, Cuxhaven, Germany), Fluor Protector (Ivoclar/Vivadent, Amherst NY), Duraflor (PharmaScience, Montreal, Canada), CavityShield (OMNII Oral Pharmaceuticals, West Palm Beach, FL, USA) and Carex (Voss, Norway). Information on fluoride varnishes can be found, for example, in Chu and Lo (Gen Dent. July-August 2006; 54 (4): 247-253).

In a preferred embodiment, the dental agent is a dental sealant. Dental sealants, also known as pit and fissure sealants, are well-known to the person skilled in the art, are widely used in the field of dentistry and are commercially available. Information on dental sealants can be found, for example, in Naaman et al. (Dent J. 2017, 5, 34). In the context of the present invention, dental sealants may be selected from the group comprising glass-ionomer cement-based sealants, resin-based sealants, and modified ceramic materials (e.g., Ormocer®). Glass-ionomer cement-based sealants comprise glass-ionomer cements, resin-modified glass-ionomer cements. Resin-based sealants comprise polyacid-modified composite resins (also termed "compomers") and resin-based composites (also termed composite resins) such as flowable composite resins.

Preferably, the dental sealant is a cement-based sealant, in particular, a glass-ionomer cement-based sealant. Thus, in one embodiment, the present invention provides a composition or a kit comprising (a) a self-assembling peptide, and (b) a glass-ionomer cement-based sealant, e.g., a glass-ionomer cement, a resin-modified glass-ionomer cement, or a glass-ionomer type material. Said composition or kit may be for use in the treatment of a carious lesion, e.g., of ICDAS-II stage 1-6. Sealants are typically used for treatment of non-cavitated carious lesions, and may be used to this end in combination with self-assembling peptides such as P11-4, either in mixed form or in the form of a kit, wherein the self-assembling peptide may be for administration first, followed by administration of the sealant.

The present invention further opens up the possibility of treatment of cavitated carious lesions, e.g., of ICDAS-II stage 3-5, in particular, 3-4 with glass-ionomer cement-based sealants in combination with self-assembling peptides such as P11-4. The advantage is that, in combination with the self-assembling peptide, secondary caries is prevented (or the incidence of secondary caries reduced.

Glass-ionomer cements belong to the class of materials known as acid-base cements and are widely used in the field of dentistry and are commercially available. Information on glass-ionomer cements can be found, for example, in Sidhu and Nicholson (J Funct Biomater. 2016, 7, 16). The terms "glass-ionomer cement" and "glass-ionomer" are used interchangeably. Another term which is used for glass-ionomer cements in the dental profession is "glass polyalkenoate cement". The major ingredients of glass-ionomer cement are polymeric water-soluble acid, basic (ion-leachable) glass and water. The polymers generally used in glass-ionomer cements are polyalkenoic acids. The glasses used for glass-ionomer cements are basic and, thus, capable of reacting with an acid to form a salt, for example, alumino-silicate glasses with fluoride and phosphate additions are often used. Commercial glasses for glass-ionomer cements are typically based on calcium or strontium compounds and contain fluoride. Glass-ionomer cements typically set within 2-3 minutes from mixing by an acid-base reaction and adhere to the tooth surface by chemical bonding by ionic bonds being formed between the carboxylate groups on the polyacid molecules and calcium ions in the tooth surface.

In the context of the present invention, "Glass Carbomer®" (GCP Dental, Netherlands) is also encompassed by the term "glass-ionomer cement-based sealant". It is a novel commercial material of the glass-ionomer type, which includes substances that are often not included in glass-ionomer formulations, for example, a silicon oil comprising a polydimethylsiloxane. Similarly, "Activa" is a rubberized glass ionomer cement based sealant and is also encompassed by the term "glass-ionomer cement-based sealant".

Resin-modified glass-ionomer cements may also be used as dental sealant in the present invention. These materials contain the same essential components as conventional glass-ionomers (basic glass powder, water, polyacid), but also include a monomer component and associated initiator system. The monomer is typically 2-hydroxyethyl methacrylate (HEMA) and the initiator is can be camphorquinone or other suitable photoinitiators.

In another embodiment, resin-based sealants, i.e., resin-based dental sealants, are used as dental sealant in the present invention. Resin-based sealants are well-known in the field of dentistry and are typically based on an oligomer matrix comprising components such as Bisphenol A-glycidyl methacrylate (bisGMA), urethane dimethacrylate (UDMA) or other dimethacrylate monomers (such as TEGMA or HDDMA), or semi-crystalline polyceram (PEX). They may be classified into four generations, determined by the method of polymerization. The first generation was polymerized by the action of ultraviolet rays. The second generation was the auto-polymerizing resin-based sealants or chemically-cured sealants. In this case, a tertiary amine (the activator) is added to one component and mixed with another component. The reaction between these two components produces free radicals that initiate the polymerization of the resin sealant material. The third generation comprises visible light-polymerizing resin-based sealants, thus, visible light, typically in the wavelength region of around 470 nm, activates photoinitiators (e.g., as explained herein) that are present in the sealant material. A fourth generation of resin-based sealants are fluoride resin-based sealants, which are a product resulting from adding fluoride-releasing particles into conventional resin-based sealant materials. Resin-based sealants may be filled or unfilled, i.e., resin-based sealants may contain filler material, e.g., as described for resin-based composites herein. Typically, unfilled resin-based sealant materials exhibit lower viscosity. Suitable commercially available resin-based sealants include Clinpro™ (3M-ESPE, St. Paul, MN, USA), Delton® FS (Dentsply-De Trey, Konstanz, Germany), Estiseal® F (Heraerus-Kulzer, Hanau, Germany), and Guardian Seal™ (Kerr, Orange, CA, USA). Thus, in one embodiment, the present invention provides a composition or a kit comprising (a) a self-assembling peptide, and (b) a resin-based sealant, e.g., for use in the treatment of a carious lesion. Resin-based sealants are typically used for treatment of non-cavitated carious lesions, and may be used to this end in combination with self-assembling peptides such as P11-4.

The present invention further opens up the possibility of treatment of cavitated carious lesions, e.g., of ICDAS-II stage 3-5, in particular, 3-4 with resin-based sealants in combination with self-assembling peptides such as P11-4. The advantage is that, in combination with the self-assembling peptide, secondary caries is prevented (or the incidence of secondary caries reduced)

As used herein, "resin-based sealants" also include resin-based composites, preferably, flowable resin-based composites (also known as flowable resin composites). Thus, resin-based composites, preferably, flowable resin-based composites may be used as dental sealants or preventive resin restorations in the present invention. The terms "resin-based composites" and "composite resins" are used interchangeably herein. Resin-based composites are types of synthetic resins which are widely used in dentistry as restorative material, dental adhesives and sealants. Conventional resin-based composites comprise a resin-based oligomer matrix and a filler material, for example, based on glass or ceramics materials. Bisphenol A-glycidyl methacrylate (bisGMA), urethane dimethacrylate (UDMA) or other dimethacrylate monomers (such as TEGMA or HDDMA), or semi-crystalline polyceram (PEX) are, for example, used as resin-based oligomer matrix. Glass fillers are usually made of crystalline silica, silicone dioxide, lithium/barium-aluminium glass, or borosilicate glass containing zinc/strontium/lithium. Ceramic fillers include zirconia-silica and zirconium oxide. Composite resins typically also contain an initiator system, such as a photoinitiator, e.g., camphorquinone, phenylpropanedione (PPD) and lucrin (TPO). These initiator systems start the polymerization reaction of the resins when blue light is applied. There are also chemically cured resin composite systems (also known as "auto-polymerizing" resin-based sealants) available, usually provided as a two-paste system (base and catalyst), which start to set when the base and the catalyst are mixed together. Various additives may be added, e.g., to control the rate of reaction or physical properties of the dental composite resins, such as dimethylglyxomine, which may be added to achieve a certain flowability. Dental composite materials exhibit the ability to adhere to tooth structure by micro-mechanical bonding, which is increased by acid etching. Very high bond strengths to tooth structure can be achieved with the additional application of dental bonding agents.

Resin-based composites may be classified according to their handling characteristic into the categories "flowable" and "packable". Typically, a flowable resin composites exhibit a filler content of below 60% by volume, such as about 35-55% by volume. Packable resin composites typically exhibit a higher filler content, e.g., above 60% by volume. Flowable resin composites generally exhibit lower viscosity and therefore favourable wetting properties and ease of handling compared to packable resin-based composites.

Suitable commercially available composite resins include, for example, Metafil (Sun Medical, Moriyama, Japan), Heliomolar® (Ivoclar-Vivadent, Liechtenstein), Solitaire® (Heraeus Kulzer, Hanau, Germany), Arabesk (Vocvo, Cuxhaven, Germany), and Charisma® (Heraeus Kulzer, Hanau, Germany). Examples for suitable commercially available flowable resin composites are Admira® Flow (Voco, Cuxhaven, Germany), Filtek™ Supreme (3M-ESPE, St. Paul, MN, USA), FlowLine (Heraeus-Kulzer, Hanau, Germany), Grandio® Flow (Voco, Cuxhaven, Germany), Point-4™ Flowable (Kerr, Orange, CA, USA), Premise™ Flowable (Kerr, Orange, CA, USA), Revolution™ Formula 2 (Kerr, Orange, CA, USA), and X-Flow™ (Dentsply-De Trey, Konstanz, Germany). Thus, in one embodiment, the present invention provides a composition or a kit comprising (a) a self-assembling peptide, and (b) a resin-based composite, preferably a flowable resin-based composite, preferably for use in the treatment of a carious lesion, more preferably for use in the treatment of a cavitated carious lesion, such as a carious lesion of ICDAS-II stage 3, 4 or 5, as described herein.

Resin-based sealants as used herein also include polyacid-modified composite resins (also termed "compomers"). Thus, the dental sealant used in the present invention may be a poly acid-modified composite resin (also termed "compomer"). Compomers resemble traditional composite resins in that their setting reaction is typically an addition polymerization, in that they contain no water and in that the majority of components are identical. Typically these are bulky macromonomers, such as bisglycididyl ether dimethacrylate (bisGMA) or its derivatives and/or urethane dimethacrlyate, which are blended with viscosity-reducing diluents, such as triethylene glycol dimethacrylate (TEGDMA). These polymer systems are filled with non-reactive inorganic powders, such as quartz or a silicate glass, for example, $SrAlFSiO_4$. These powders are usually coated with a silane to promote bonding between the filler and the matrix in the set material. Compomers typically contain additional monomers that differ from those in conventional composites, which contain acidic functional groups, for example, a di-ester of 2-hydroxyethyl methacrylate with butane tetracarboxylic acid (TGB). The setting reaction is usually light-initiated, but there are also systems where cure is brought about as a result of mixing two pastes, each of which contains a component of the free radical initiator system. Examples for suitable commercially available compomers include Ana Compomer (Nordiska Dental, Sweden), Dyract® (Dentsply, Konstanz, Germany), Compoglass® (Ivoclar-Vivadent, Liechtenstein), F2000 Compomer (3M-ESPE, St. Paul's, MN, USA), Freedom (SDI, Bayswater, Victoria, Australia), Hytac® (3M-ESPE, Seefeld, Germany), MagicFil (Zenith, Englewood, NJ, USA), Twinky Star (Voco, Cuxhaven, Germany). Thus, in one embodiment, the present invention provides a composition or a kit comprising (a) a self-assembling peptide, and (b) a polyacid-modified composite resin, preferably, for use in the treatment of a carious lesion, more preferably for use in the treatment of a cavitated carious lesion, such as a carious lesion of ICDAS-II stage 3, 4 or 5, as described herein.

In another embodiment, the dental agent used in the present invention is a dental bonding agent, also termed "dentine bonding agents". Dental bonding agents are well known in the field of dentistry and are typically resin materials that are conventionally used to make a dental composite filling material adhere firmly to both dentin and enamel. Dental bonding agents are often methacrylates with some volatile carrier and solvent like acetone or ethanol/water. As adhesives, BisGMA or TEGMA are typically used. The application of dental agents usually requires the use of etchants, such as phosphoric acid, citric acid/calcium chloride, or oxalic acid/aluminium nitrate etc., the use of primer, such as NTG-GMMA/BPDM, HEMA/GPDM, or 4META. There are dental bonding agent systems available which combine all necessary components in one composition. Others provide the components separately. Suitable commercially available dental bonding agents include 3M™ Scotchbond™ Universal Adhesive (3M ESPE, St. Paul, MN, USA), ACER ALL-BOND (BISCO Dental Products, Schaumburg, IL, USA), Admira Bond (VOCO, Cuxhaven, Germany), BeautiBond 7th-generation adhesive (Shofu Dental Corporation, Ratingen, Germany), CLEARFIL SE Bond 2 (Kuraray America Inc., Houston, TX, USA), Futurabond U (VOCO, Cuxhaven, Germany), G-Premio BOND™ (GC America Inc., Alsip, IL, USA), and Prelude™ (Zest Dental Solutions, Carlsbad, CA, USA). Thus, in one embodiment, the present invention provides a composition or a kit comprising (a) a self-assembling peptide and (b) a dental bonding agent, preferably, for use in the treatment of a carious lesion, more preferably for use in the treatment of a cavitated carious lesion, such as a carious lesion of ICDAS-II stage 3, 4 or 5, as described herein.

In the present application, more than one type of dental agent may be used. For example, the kit according to the present application may comprise a glass-ionomer cement based dental sealant, and a fluoride varnish. Thus, for example, when using such kit for treating a carious lesion, the self-assembling peptide may be applied first to the optionally cleaned and/or treated tooth surface, e.g., the carious lesion surface (either before the fluoride varnish or in one composition with the fluoride varnish), and the glass-ionomer cement may be applied after application of the fluoride varnish.

In one embodiment of the invention, no fluoride varnish is applied.

In the context of the present invention, it is preferred that the dental agent, e.g., the glass-ionomer cement, the calcium-silicate based cement, the polyacid-modified composite resin, or the resin-based sealant is capable of releasing fluoride. In a particularly preferred embodiment, the dental agent is capable of releasing calcium and fluoride. For example, glass-ionomer cements have both properties, as they are based on a calciumaluminofluorosilicate glass powder or strontium based glasses and an acid, typically, polyacrylic acid. The dental agent may also, or alternatively, be permeable to ions, e.g., from saliva, in particular, after being applied to the tooth. Accordingly, substances present in saliva, such as calcium or phosphates, are able to permeate the dental agent. These two characteristics improve remineralisation of the surface of the tooth, in particular, the cavity, already before the dental agent fails, and thus improve protection.

There are dental agents, e.g., dental sealants which have a basic pH, and there are dental agents, e.g., dental sealants which have a neutral or acidic pH. pH of the dental agent can be determined before setting of the material, in particular, in an aqueous environment. For example, many cements, e.g., Portland cement are basic. Both basic or neutral or acidic dental agents may be used in the context of the invention, but this may influence the type of self-assembling peptide used, as explained in further detail below.

Portland cement is an example of a calcium-silicate based cement, which may be used in the context of the invention. It is preferably used for dentine restorations in close proximity to the dental pulp due to the relatively long setting times. For example, mineral trioxide aggregate (MTA), e.g., quick-setting mineral trioxide aggregate such as Biodentine (Septodont, Saint Maur des Fosses, FR), which sets within around 12 minutes or shorter; Watson et al., 2014. Dental Mater. 30(1):50-61), can be used.

Self-assembling peptides used in the present invention are peptides that are capable of forming three-dimensional scaffolds, thereby promoting tissue regeneration. They may assemble in one dimension to form beta-sheet, and higher order assemblies such as tape-like assemblies. Three-dimensional supramolecular structures of self-assembling proteins can be formed, which have an affinity for/to calcium phosphate.

In the context of the present invention, self-assembling peptides may be able to self-assemble by themselves, as is the case, e.g., for the peptides P11-4, P11-8, P11-2, P11-5 mentioned below, but they can alternatively be able to self-assemble in a combination of two self-assembling peptides, as is the case, e.g., for the peptides P11-13/P11-14 and P11-28/P11-29, P11-30/P11-31 mentioned below.

In the context of the present invention, self-assembling peptides taught in WO 2004/007532 A1, U.S. Ser. No. 10/521,628, U.S. Ser. No. 12/729,046, U.S. Ser. No. 13/551,878, U.S. Ser. No. 14/062,768, or WO2014/027012 A1, which are all fully incorporated herein by reference, are preferred. In particular, self-assembling peptides having a net charge of +2 or −2 at pH 7.5, may be used in monomeric or assembled form.

Self-assembling peptides used in the present invention preferably comprise a sequence of the formula X1-X2-X1-X2-X1, wherein X1 is an amino acid with an acidic side chain and X2 is an amino acid with a hydrophobic side chain. For example, the self-assembling peptide used in the present invention comprises the consensus sequence SEQ ID NO: 1, X1-X2-X1-X2-X1, wherein X1 is independently selected from the group consisting of glutamic acid, aspartic acid, glutamine and ornithine, and X2 is independently selected from the group consisting of alanine, valine, isoleucine, leucine, methionine, phenylalanine, tyrosine, tryptophan and glutamine, or an amino acid sequence having at least 80% identity thereto. Independently selected means that, e.g., X1 in positions 1, 3 or 5 of the sequence above can be different from each other. Of course, they can also be identical.

Preferably, self-assembling peptides used in the invention comprise SEQ ID NO: 2, X1-X2-X1-X2-X1, wherein X1 is independently selected from the group consisting of glutamic acid and ornithine, and X2 is independently selected from the group consisting of tryptophan and phenylalanine.

In a further embodiment, self-assembling peptides used in the invention may comprise SEQ ID NO: 3, X3-F-X1-W-

X1-F-X1, wherein X1 is independently selected from the group consisting of glutamic acid and ornithine, and X3 is selected from the group consisting of arginine, glutamic acid and ornithine, wherein X3 preferably is arginine.

Furthermore, self-assembling peptides used in the invention may comprise SEQ ID NO: 4 or, preferably, consist thereof: X4-X4-X3-F-X1-W-X1-F-X1-X4-X4, wherein X1 is independently selected from the group consisting of glutamic acid and ornithine, and wherein X3 is selected from the group consisting of arginine, glutamic acid and ornithine, and wherein X4 is independently selected from the group consisting of glutamine, glutamic acid, serine, threonine and ornithine. X3 preferably is arginine. Independently, X4 preferably is glutamine.

Self-assembling peptides of the invention may comprise SEQ ID NO: 5, or, preferably, consist thereof: Q-Q-R—F-X1-W-X1-F-X1-Q-Q, wherein X1 is independently selected from the group consisting of glutamic acid and ornithine.

Preferably, the self-assembling peptides used in the present invention comprise or consist of a sequence selected from the consensus sequences listed in Table 1 below.

Most preferably, said peptides comprise the specific peptides listed in Table 2 or consist thereof. Of course, self-assembling peptides assembling in combination with another self-assembling peptide, e.g., as disclosed herein, may be formulated in one kit or in one composition.

Peptides of SEQ ID NO: 6, 9, 11, 12, 16 or 17 are particularly advantageous, e.g., as they can be used in relatively low concentrations, they are highly compatible with cells and have beneficial charge distribution.

Preferably, the self-assembling peptide comprises the sequence of SEQ ID NO: 6 or consists thereof. A peptide consisting of a sequence of SEQ ID NO: 6 is also designated P11-4, and is preferred throughout the invention. In another preferred embodiment, the self-assembling peptide comprises the sequence of SEQ ID NO: 9 or consists thereof (P11-8).

The kit or composition of the invention may also comprise at least one self-assembling peptide having at least 45% sequence identity to a peptide consisting of SEQ ID NO: 6. Preferably, the peptide has at least 54%, at least 63%, at least 72%, at least 81% or at least 90% sequence identity to a peptide consisting of SEQ ID NO: 6, or is said peptide. Peptides of the invention are, for example, 11 amino acids in length.

Self-assembling peptides may be modified peptides comprising an Ac—N-terminus and/or $NH_2$—C-Terminus, preferably, both, or non-modified peptides. As non-blocked forms tend to start a deaminization reaction, the termini of all self-assembling peptides of SEQ ID NO: 1 are preferably blocked to increase stability. In particular, peptides of SEQ ID NO: 6, 9, 11, 12, 16 and 17 may comprise an Ac—N-terminus and $NH_2$—C-Terminus. SEQ ID NO: 18-29 correspond to modified peptides of the invention.

TABLE 1

Consensus sequences of preferred self-assembling peptides

| SEQ ID NO | Peptide name | Sequence | Exemplary SAP |
|---|---|---|---|
| SEQ ID NO: 1 | Consensus sequence 1 | X1-X2-X1-X2-X1, wherein X1 is independently selected from the group consisting of glutamic acid, aspartic acid, glutamine and ornithine, and X2 is independently selected from the group consisting of alanine, valine, isoleucine, leucine, methionine, phenylalanine, tyrosine, tryptophan and glutamine | P11-2, P11-4, P11-5, P11-8, P11-12, P11-13, P11-14, P11-17, P11-19, P11-20, P11-28, P11-29 |
| SEQ ID NO: 2 | Consensus sequence 2 | X1-X2-X1-X2-X1, wherein X1 is independently selected from the group consisting of glutamic acid and ornithine, and X2 is independently selected from the group consisting of tryptophan and phenylalanine | P11-4, P11-8, P11-12, P11-13, P11-14, P11-17, P11-28, P11-29 |
| SEQ ID NO: 3 | Consensus sequence 3 | X3-F-X1-W-X1-F-X1, wherein X1 is independently selected from the group consisting of glutamic acid and ornithine, and X3 is selected from the group consisting of arginine, glutamic acid and ornithine, wherein X3 preferably is arginine | P11-4, P11-8, P11-12, P11-13, P11-14, P11-17, P11-28, P11-29 |
| SEQ ID NO: 4 | Consensus sequence 4 | X4-X4-X3-F-X1-W-X1-F-X1-X4-X4, wherein X1 is independently selected from the group consisting of glutamic acid and ornithine, and wherein X3 is selected from the group consisting of arginine, glutamic acid and ornithine, and wherein X4 is independently selected from the group consisting of glutamine, glutamic acid, serine, | P11-4, P11-8, P11-12, P11-13, P11-14, P11-17, P11-28, P11-29 |

TABLE 1-continued

Consensus sequences of preferred self-assembling peptides

| SEQ ID NO | Peptide name | Sequence | Exemplary SAP |
|---|---|---|---|
| | | threonine and ornithine. X3 preferably is arginine. Independently, X4 preferably is glutamine. | |
| SEQ ID NO: 5 | Consensus sequence 5 | Q-Q-R-F-X1-W-X1-F-X1-Q-Q, wherein X1 is independently selected from the group consisting of glutamic acid and ornithine. | P11-4, P11-8 |

TABLE 2

Preferred self-assembling peptides. Positions X1 are underlined

| SEQ ID NO | Peptide name | Sequence (One letter code) | % amino acid identity to P11-4 (ClustalW (2.1, standard parameters)) |
|---|---|---|---|
| SEQ ID NO: 6 | P11-4 | QQRFEWEFEQQ | 100 |
| SEQ ID NO: 7 | P11-2 | QQRFQWQFEQQ | 81.8 |
| SEQ ID NO: 8 | P11-5 | QQRFOWOFQQQ | 72.7 |
| SEQ ID NO: 9 | P11-8 | QQRFOWOFEQQ | 81.8 |
| SEQ ID NO: 10 | P11-12 | SSRFOWOFESS | 45.4 |
| SEQ ID NO: 11 | P11-13 | EQEFEWEFEQE | 72.7 |
| SEQ ID NO: 12 | P11-14 | QQOFOWOFOQQ | 63.6 |
| SEQ ID NO: 13 | P11-17 | TTRFEWEFETT | 63.6 |
| SEQ ID NO: 14 | P11-19 | QQRQOQOQEQQ | 54.5 |
| SEQ ID NO: 15 | P11-20 | QQRQEQEQEQQ | 72.7 |
| SEQ ID NO: 16 | P11-28 | OQOFOWOFOQO | 45.4 |
| SEQ ID NO: 17 | P11-29 | QQEFEWEFEQQ | 90.9 |
| SEQ ID NO: 30 | P11-16 | NNRFOWOFENN | 45.4 |
| SEQ ID NO: 31 | P11-18 | TTRFOWOFETT | 45.4 |
| SEQ ID NO: 32 | P11-26 | QQOQOQOQOQQ | 36.4 |
| SEQ ID NO: 33 | P11-31 | SSOFOWOFOSS | 27.3 |

The self-assembling peptides preferably do not have restriction sites for the subject's endopeptidases. They also do not need to comprise a special recognition motif for cells.

In one embodiment, in the kit or composition according to the present invention, the self-assembling peptide is in predominantly monomeric form, e.g., at least 70%, at least 80%, or at least 90% of the self-assembling peptides are present in a monomeric state. To this end, if the peptide assembles in a pH at or below 7.5, the pH of the composition may be above the pH wherein the peptide starts to undergo self-assembly (e.g., pH 7.5 for P11-4), preferably, 0.1 to 0.5 pH units above said pH, or more than 0.5 pH units above said pH. The pH may be buffered at that pH to avoid quick aggregation. It may be beneficial if aggregation, and formation of a hydrogel starts quickly after application to the caries cavity. Accordingly, the pH may be 0.1 to 0.5 pH units above the pH at which the peptide starts to undergo self-assembly, without buffering. In one embodiment, the composition may comprise dried peptide, e.g., obtainable according to WO 2014/027012.

In another embodiment, the kit or composition according to the invention comprises self-assembling peptides in predominantly assembled form, e.g., at least 70%, at least 80%, or at least 90% are in assembled form, or essentially assembled form, and a buffer (at a pH stabilizing the assembled form). Assembled self-assembling peptide typically forms a hydrogel.

Selection of the assembly state of the protein depends on several factors. A predominantly monomeric form of the self-assembling peptide improves diffusion of the monomer into demineralized enamel, and may be particularly advantageous for smaller cavitated lesions, e.g., partially cavitated lesions or lesions with microcavities (e.g., ICDAS 1-3). A predominantly assembled form may lead to quicker action of the peptide and thus improve function, in particular for larger cavities (e.g., ICDAS 4, 5 or 6). If the self-assembling peptide and the dental agent are mixed, the pH the dental agent requires for setting and the ionic strength will typically be decisive. In the case of a composition comprising both dental agent and self-assembling peptide, at the respective pH, either a predominantly monomeric self-assembling peptide or a predominantly polymeric self-assembling peptide may be used.

Combinations of complementary self-assembling peptides, e.g., of P11-4 and P11-8, provide a significant faster assembly time resulting in a faster application and stability due to their attraction to each other.

For example, the present invention provides a composition or a kit comprising (a) a self-assembling peptide comprising a consensus sequence according to SEQ ID Nos: 1-5, such as a consensus sequence according to SEQ ID NO: 1, preferably a consensus sequence according to SEQ ID NO: 2, more preferably a consensus sequence according to SEQ ID NO: 3, even more preferably a consensus sequence according to SEQ ID NO: 4, and most preferably a consensus sequence according to SEQ ID NO: 5, and (b) a dental agent, such as a dental sealant, preferably a glass-ionomer cement-based sealant, e.g., for use in the treatment of a cavitated carious lesion, such as a carious lesion of ICDAS-II stage 4 or 5, as described above. In particular, it may be used for prevention of secondary caries.

In a preferred embodiment, the present invention provides a composition or a kit comprising (a) a self-assembling peptide comprising, preferably consisting of, a sequence selected form the sequences according to SEQ ID NOs: 6-17 and 30-33, or a sequence having at least 80%, more preferably at least 90% identity thereto, preferably the sequence according to SEQ ID NO: 6 or a sequence having at least 80%, more preferably at least 90% identity thereto, and (b) a dental agent, such as a dental sealant, preferably a glass-ionomer cement-based sealant, preferably for use in the treatment of a carious lesion, both early and advanced carious lesion, more preferably for use in the treatment of a cavitated carious lesion, such as a carious lesion of ICDAS-II stage 3-5, as described above. P-11 is most preferred for use in the context of the present invention. In particular, it may be used for prevention of secondary caries.

In a particular preferred embodiment, the present invention provides a composition or a kit comprising (a) a self-assembling peptide comprising, preferably consisting of the sequence according to SEQ ID NO: 6, and (b) a glass-ionomer cement-based sealant, preferably for use in the treatment of a carious lesion, more preferably for use in the treatment of a carious lesion of ICDAS-II stages 3-5, such as 4 or 5, as described above. In particular, it may be used for prevention of secondary caries.

In the context of the invention, the self-assembling peptide employed may undergo self-assembly at a low pH, in particular, at a pH below 7.5, e.g., P11-4. Carious lesions typically have an acidic pH, which ensures assembly of the self-assembling peptide in the lesion. A preferred peptide which undergoes self-assembly at a low pH, in particular, at a pH below 7.5 is P11-4.

The term that the self-assembling peptides (SAPs) undergo self-assembly at a pH below 7.5 means that they are capable of self-assembly at a pH below 7.5. The ionic strength also influences the assembly state of the selected self-assembling peptide. Preferably, the self-assembling peptides used in the present invention are capable of self-assembly at a pH below 7.5 and at least physiologic ionic strength. Self-assembling peptides capable of self-assembly at a pH below 7.5 and at least physiologic ionic strength may start undergoing self-assembly at said pH, as is, e.g., the case for a preferred peptide, P11-4, but that is not required. They can also be capable of being in a self-assembled state at a higher or lower pH.

The skilled person will know how to determine and measure the ionic strength of a solution. The ionic strength I is generally calculated according to the formula $I = \frac{1}{2}\Sigma z_i^2 b_i$, wherein z is the valence factor and bi is the molality [mol/kg{$H_2O$}] of the $i^{th}$ ion concentration. The summation ,$\Sigma$, is taken over all ions in a solution. For example, the ionic strength of a 150 mM NaCl solution is approximately 0.15 mol/L. This is also approximately the ionic strength of blood. The ionic strength of saliva present in the oral cavity, is generally much lower, such as approximately 0.04 mol/L. In the context of the invention, ionic strength in the physiological range is considered to be corresponding to a ionic strength of 0.15 mol/L.

If desired, the mechanical properties can be influenced by the concentration of the self-assembling peptide and additionally the type of molecules and ions present in the composition. A composition comprising a self-assembling peptide employed in the invention may e.g., comprise NaCl and, optionally, a biologically suitable buffer such as Tris.

In one embodiment, the assembly state of the self-assembling peptide may also be controlled by the ionic strength, e.g., assembly may be induced by combination with a buffer of high ionic strength (e.g., above 0.15 mol/L), which may further comprise calcium, phosphate and/or fluoride ions.

The pH in the lesion (or between the surface of the cavitated carious lesion and the dental agent) may be influenced by the pH of the dental agent. Most dental agents have a neutral or acidic pH, e.g., chitosan-arginine-amide.

Alternatively, in the context of the invention, the self-assembling peptide employed may alternatively undergo self-assembly at a high pH, in particular, at a pH of at least 7.5. In this case, the dental agent typically has a pH of at least 7.5, e.g., a Portland cement or any calcium hydroxide based material. A preferred peptide which undergoes self-assembly at a high pH, in particular, at a pH of at least 7.5 is P11-8.

One aspect of the present invention is the composition or the kit according to the present invention for use in the treatment of a cavitated carious lesion as described above, preferably, a cavitated carious lesion in enamel, in particular, for use in preventing or reducing the incidence of secondary caries after failure of the dental agent. Accordingly, a primary carious lesion may be treated wherein the incidence of secondary caries is reduced by the treatment of the invention. The treatment of the carious lesion in the context of the present invention is typically performed by a dental practitioner.

Treatment may comprise steps of (a) cleaning of the tooth surface, (b) optionally, drying of the tooth surface, (c) optionally, etching the tooth surface, (d) administering the composition or the components of the kit to the carious lesion, and (e) optionally, curing, wherein steps (b) and (c), if present, may be performed in any order.

Typically, step (a) precedes steps (b) to (e) of the treatment procedure. Steps (b) to (d) are more flexible in their sequence of application and step (e) typically follows steps (b) to (d). Thus, for example, etching (if applied) may be performed before or after drying or in between step (d) etc. The sequence and application of the steps are usually dependent on the type of dental agent used in the present invention, and correspond to the sequence and application of steps typically taken for said dental agent if the dental agent is used without self-assembling peptide. For example, if a resin-based sealant is used as dental agent, it is advantageous that the surface of the tooth is etched before application of the resin-based sealant. Resin-based sealants are also more moisture sensitive than glass-ionomer cements. Thus, in case of the application of resin-based sealants, drying of the tooth surface is advantageous. Preferably, in this case, the tooth is both died and etched. The dental practitioner is aware of the recommendable treatment steps for the different dental agents.

Step (a), "cleaning of the tooth surface" means that at least the surface of the carious lesion is cleaned, i.e. substances such as food particles, tooth deposits, dental plaque or dental films etc. are removed from the tooth surface, at least from the surface of the carious lesion, by suitable methods. Such cleaning methods may include treatment with a conventional tooth brush, treatment with specified dental brushes, e.g., brushes for removal of dental plaque, treatment with dental scalers and currettes, application of mouth washes, for example, using antibacterial mouth washes etc. Cleaning preferably comprises removal of plaque. Cleaning may further comprise partial or complete removal of carious tooth material, e.g., by drilling, air abrasion, or laser ablation, by application of a spoon excavator, or by chemo-mechanical removal (e.g., using the Carisolv® system). Removal of carious tooth material is generally not required in the context of the invention and, preferably, no drilling is performed.

Nonetheless, in case of carious lesions of more advanced caries stages, such as carious lesions of ICDAS-II stages 3, 4, 5 and 6, it may be advantageous to at least partially remove decayed tooth material. In case removal of carious tooth material is performed, it is preferred that carious tooth material is removed by a "gentle" method, such as by using a spoon excavator or a chemomechanical removal method, and not by drilling. The inventors found that, in the context of enamel lesions without dentinal involvement (as preferred herein), it is not necessary to remove carious material completely. It is particularly preferred that no intact tooth material is removed in the process of removing carious material, which is typically the case when drilling is used as removal technique. In case of lesions with dentinal involvement, carious material is preferably removed.

As described above, application of step (b), i.e., drying of the tooth surface, may be advantageous for application of particular dental agents, such as resin-based sealants, dental bonding agents, or resin-based composites. Drying may be performed before etching (if etching is performed), after etching, or in the context of step (d), for example, between the application of the self-assembling peptide and the application of the dental agent. Drying of tooth surfaces is usually performed using an air stream.

Furthermore, step (c), i.e., etching the tooth surface, may be advantageous for application of particular dental agents, such as resin-based sealants, dental bonding agents, or resin-based composites. Etching is a common technique conventionally used in the procedure of dental sealing. "Etching" means to create microscopic porosity on the tooth surface into which the self-assembling peptide and/or the dental agent, such as a dental sealant material, can flow, thereby increasing retention, increasing surface area and improving strength of the bond between the dental agent and the tooth surface. Etching agents that may be used in the context of the present invention comprise maleic acid, EDTA, citric acid, tartaric acid, phosphoric acid, nitric acid, and polyacrylic acid. A particular preferred etching agent is phosphoric acid, which is often also designated as a conditioning agent. Typically, the etching agent is applied to the cleaned and optionally dried tooth surface for a time period between 10 and 60 seconds, such as for 15-30 seconds. Upon etching, the tooth surface is preferably rinsed, e.g., with water. Depending on the applied dental agent, the tooth surface is dried after the optional rinsing step before application of the dental agent, e.g. in case of resin-based sealants. In one embodiment, etching is be performed after application of self-assembling peptide and before application of the dental agent.

Step (d) includes the administration of the composition or the components of the kit to the carious lesion, preferably the cavitated carious lesion. This means that the composition or the components of the kit are administered to the carious lesion by suitable techniques known to the dental practitioner, e.g., by filling. When the kit of the invention is used for the treatment of a carious lesion, preferably, step (d) comprises (i) administering the self-assembling peptide or the composition comprising the self-assembling peptide (comprised by the kit) to the carious lesion and then (ii) administering the dental agent to the carious lesion. "Application of the dental agent" typically refers to application as it is professionally and conventionally performed by a dental practitioner, e.g. according to manufacturer's instructions. The self-assembling peptide may be administered, e.g., as a solution in a suitable buffer. The self-assembling peptide may be administered to the carious lesion by means of any suitable applicator, e.g., a syringe, a sponge etc. For example, the application used in Curodont® Repair may be employed. The kit preferably also comprises the applicator.

In one embodiment, step (d) comprises administering a mixture of the self-assembling peptide and the dental agent to the cavitated carious lesion. This mixture may be the composition according to the present invention or the components of the kit of the present invention mixed before or upon administration. The mixture may be administered as conventionally performed in the field of dentistry for the respective dental agent, for example, according to manufacturer's instructions.

The application of optional step (e), i.e., curing, is dependent on the dental agent used. Most of the dental agents require some kind of curing. The term "curing" refers to a process during which a chemical reaction (such as polymerisation) or physical action (such as evaporation) takes place, resulting in a harder, tougher, or more stable linkage (such as a bond) or substance (such as a cured resin). Typical curing for dental material is chemical curing, curing by application of light, thermal curing or a combination thereof.

Thus, the present invention provides, for example, the composition or the kit according to the present invention for use in the treatment of a carious lesion, preferably a cavitated carious lesion, such as a carious lesion of ICDAS-II stage 3, 4 or 5, as described above, wherein the treatment of the carious lesion comprises the steps of (i) cleaning of the tooth surface comprising removing plaque, in particular cleaning the surface of the caries lesion, optionally, including removing decayed material partially or fully, wherein preferably no drilling is performed, (ii) administering a composition comprising a self-assembling peptide as described above to the carious lesion, such as a self-assembling peptide comprising a consensus sequence according to SEQ ID Nos: 1-5 (e.g., P11-4), (iii) administering a dental agent to the carious lesion, such as a glass-ionomer cement-based sealant or a fluoride varnish, and (iv) curing the fluoride varnish, e.g., by drying, or the glass-ionomer cement-based sealant, e.g. by chemical curing or a combination of chemical curing and curing by visible light. The sequence of the steps may be from (i) to (iv).

Another example for the composition or the kit for use according to the present invention is the composition or the kit according to the present invention for use in the treatment of a carious lesion, preferably a cavitated carious lesion, such as a carious lesion of ICDAS-II stage 3, 4 or 5, as described above, wherein the treatment of the carious lesion comprises the steps of (i) cleaning of the tooth surface comprising removing plaque, in particular cleaning the surface of the caries lesion, optionally, including removing decayed material partially or fully, wherein preferably no drilling is performed, (ii) optionally drying the surface of the carious lesion, (iii) applying an etching agent such as phosphoric acid to the surface of the carious lesion for a suitable period of time and thereby etching the surface of the tooth with the carious lesion, (iv) removing the etching agent, for example by rinsing, (v) administering a composition comprising a self-assembling peptide as described above to the carious lesion, such as a self-assembling peptide comprising a consensus sequence according to SEQ ID NOs: 1-5 (e.g., P11-4), (vi) drying the surface of the tooth with the carious lesion, (vii) administering a resin-based sealant, preferably according to manufacturer's instructions, and (viii) curing the resin-based sealant by a suitable curing method.

The selection of dental agents in the context of the invention may be influenced by the type of carious lesion which is to be treated. For example, the invention advantageously enables use of a dental sealant for cavitated carious lesions of any size or for occlusal carious lesions in the pits and/or fissures of a tooth.

Furthermore, the present invention provides a method for treating a cavitated carious lesion, comprising administering the components of the kit or the composition of the invention to said carious lesion. For example, the method may comprise steps (a) to (e) as described above, i.e., (a) cleaning of the tooth surface, (b) optionally, drying of the tooth surface, (c) optionally, etching or conditioning the tooth surface, (d) administering the composition or the components of the kit to the carious lesion, and (e) optionally, curing, as described above for the composition and kit for use in the treatment of a carious lesion.

The present invention further solves an additional technical problem. In particular, during excavation of a caries lesion, the dental pulp may be exposed, or nearly exposed, increasing the danger of pulpitis or retraction of the pulp, due to adverse reaction of the pulp towards the dental material (sealant, bonding agent, filler, resin etc. . . . ). The inventors surprisingly found that, to prevent the pulp from deteriorating when a dental restoration gets near the pulp, the dentist may employ the kit or composition of the invention. Thus, the invention provides the composition or the kit according to the present invention for use in pulp capping. The dental material may be a dental agents as described above, such as a dental sealant or a bonding agent, or a filler, etc. It may be a glass-ionomer cement-based sealant selected from the group comprising glass-ionomer cements and resin-modified glass-ionomer cements, or a resin-based sealant selected from the group comprising polyacid-modified composite resins and resin-based composites. In this context, resin-based composites are preferred dental materials.

For example, if, e.g., in the context of cleaning, in particular, excavating a carious lesion, the pulp is exposed or nearly exposed (to an extent, which, as can be recognized by the skilled person, increases the risk of retraction of the pulp or pulpitis) a self-assembling peptide (e.g., P11-4 or mixture of P11-4 and P11-8, preferably, P11-4) solution may be applied to protect the pulp and improve remineralisation, and then a dental material, e.g., the dental sealant is applied.

Alternatively, the self-assembling peptide (e.g., P11-4 or mixture of P11-4 and P11-8, preferably, P11-4) and the dental material may be mixed before application, which is most relevant if the dental material is also biocompatible with pulp (e.g., MTA).

The composition or kit of the present invention may be used for pulp capping.

Pulp capping may be direct or indirect pulp capping. Remineralisation of the thin layer of softened dentin remaining for indirect pulp capping, which can be improved by the self-assembling peptide employed in the context of the invention, is particularly advantageous. Glass ionomer or resin modified glass ionomers can also be used in the context of pulp capping of the invention, in particular, for indirect pulp capping. If desired, different layers of dental sealant may be applied over the pulp cap.

If self-assembling peptide is placed over the pulp to protect the pulp from retracting due to cytotoxicity of the dental filling material, one source of calcium ions for remineralisation may be the pulp. In case of pulp capping, ions for remineralisation originate from the pulp (or via the blood supply of the pulp), and remineralisation can start immediately after placement (without/before filling failure or formation of microgaps or microleakage). Of course, additional ions, including fluoride, may originate from the dental material. Thus, fluoride-releasing dental materials such as glass ionomer cements are also advantageous in this context.

The present invention is illustrated, but not limited, by the following examples. All references cited herein are fully incorporated herewith.

FIGURE LEGENDS

FIG. 1.1 Treatment of a partially cavitated carious lesion (ICDAS class 3).

A: Cross section of partially cavitated tooth; partial cavitation on the left.

B: After tooth cleaning, here, without excavation, application of predominantly monomeric self-assembling peptide (e.g., P11-4, strips) solution onto tooth surface. The self-assembling peptide starts to diffuse into the cavity.

C: The self-assembling peptide, e.g., P11-4, assembles in the cavity due to the low pH, generating a matrix.

D: The tooth surface is dried, leaving the assembled P11-4 ribbons & fibres within the lesion E: After the solution has been absorbed into the cavity, a sealant such as a glass-ionomer cement (GIC) is applied, allowing the diffusion of ions (calcium and phosphate) from the saliva and from the glass-ionomer cement into the lesion body.

F: Mineralization (hexgons) within the lesion protects the failing sealant, resulting in a mineralised structure underneath the lesion (protected by the sealant, e.g., GIC).

After failure of the GIC, a fully regenerated tooth surface and structure remains.

FIG. 1.2

A: Cross section of partially cavitated tooth; partial cavitation on the left.

B: Excavated caries lesion

C: Application of monomeric P11-4 (strips), either at the same time as filler, or sequentially.

D: Excavitated tooth with Filler (grey) and fibrillar P11-4 (longer strips) at the interface between tooth and filler E: Mineralisation (hexagons) within the microgaps between filler and tooth. Calcium Phosphate supplied either from filler (if glass-ionomer cement), saliva or from pulp (via dentinal fluid).

FIG. 2 Treatment of a cavitated carious lesion (ICDAS class 4) with a composition of the invention in a caries model, as described in Example 2. In the right and left column, two representative examples are shown.

A, B: Drilling of artificial cavity

C, D: Application of 1 drop of P11-4, 10 mg/mL, pH 8

E, F: Application of Glass-Ionomer Cement (Aqual Ionofill Plus, VOCO)

Figure 3:
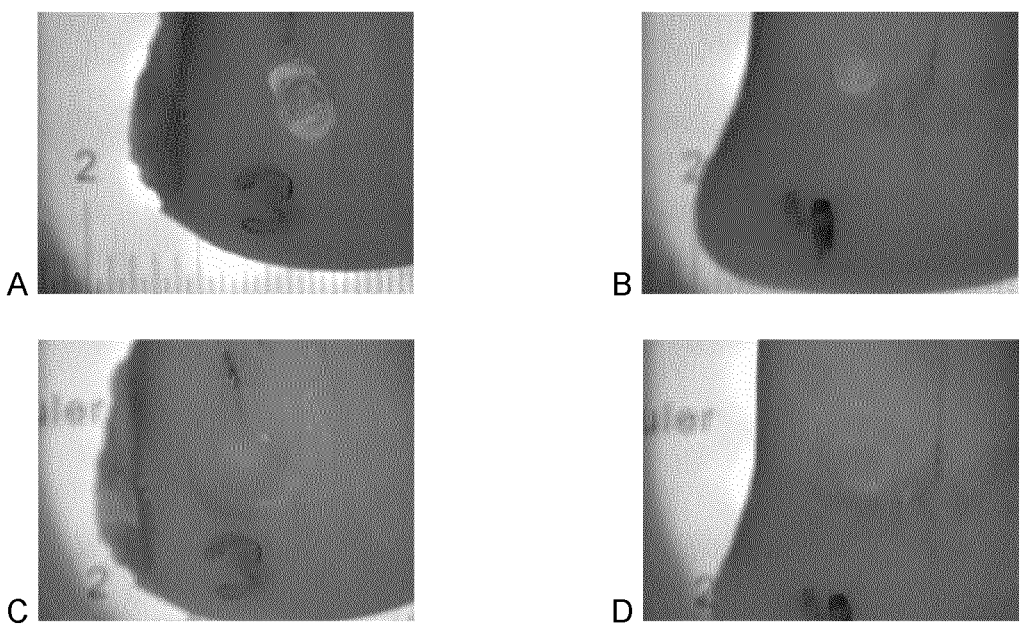

FIG. 3 Treatment of a cavitated carious lesion (ICDAS class 4) with a kit of the invention in a caries model, as described in Example 3. In the right and left column, two representative examples are shown.

A, B: Drilling of artificial cavity.

C, D: Application of Glass-Ionomer Cement (Aqual Ionofill Plus, VOCO) mixed with 1 drop of P11-4, 10 mg/mL, pH 8.

Figure 4C:
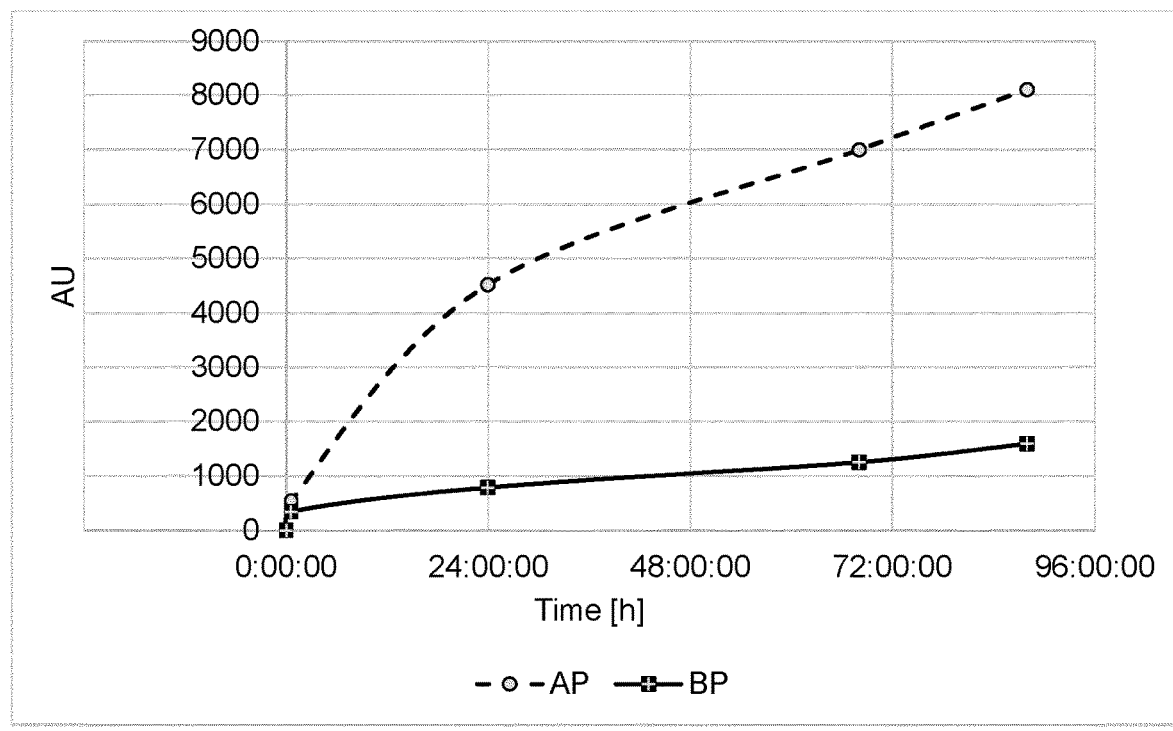

FIG. 4 Release profile of the model substance Congo Red and P11-4 from varnish, glass-ionomer cement and Paro-Amin Fluor Gelée. The experiment was conducted as specified in Examples 6 and 7. The release was measured as described and is specified in Arbitrary units (AU). FIG. 4A shows release of Congo Red from the varnish Duraphat (sample A1) and glass-ionomer cement Aqua Ionofil Plus (sample B1), and FIG. 4B shows release of Congo Red from paro Amin Fluor Gelée (Sample 2). FIG. 4C shows release of monomeric P11-4 from the varnish Duraphat (sample AP) and glass-ionomer cement Aqua Ionofil Plus (sample BP).

EXAMPLES

Example 1

A partially cavitated lesion (ICDAS class 3) is cleaned. It is either excavated (FIG. 1.2) or not excavated (FIG. 1.1). After cleaning, optionally including excavation, self-assembling peptide (e.g., P11-4) is applied onto the cleaned surface of the tooth, in particular, to the cavity. The self-assembling peptide starts to diffuse into the cavity. There, the self-assembling peptide assembles due to the low pH, generating a matrix. After the solution has been absorbed in to dentine or enamel (10 sec-5 min, dependent e.g. on the surface, quicker absorption in dentine than enamel), a sealant such as a glass-ionomer cement is applied, allowing the diffusion of ions (Ca and phosphate) from the saliva or the glass ionomer into the lesion body. This allows for a start of mineralization in the matrix protected by the sealant. After the sealant has fallen off the tooth, typically, after several months or years, a fully regenerated tooth surface and structure remains, in the absence of secondary caries.

Example 2

An artificial ICDAS class 4 lesion, generated by drilling in an excised bovine incisor was treated with a kit of the invention, in particular by application of 1 drop of P11-4, 10 mg/mL, pH 8, followed by a glass-ionomer cement (Aqual Ionofill Plus, VOCO) according to the manufacturer's instructions. In brief, polyacrylic acid conditioner was applied for 10 seconds, rinsed, slightly dried, glass ionomer applied and the material allowed to mature prior to finishing procedures. The main steps are shown in FIG. 2. The glass-ionomer cement cured to yield a hard restoration undistinguishable from a restoration applied without combination with P11-4 (data not shown). No differences could be determined up to one week after application either.

Example 3

An artificial ICDAS class 4 lesion, generated by drilling in an excised bovine incisor was treated with a composition of the invention. Glass-ionomer cement powder (Aqual Ionofill Plus, VOCO) was prepared according to the manufacturer's instructions. 1 mg P11-4 per 100 mg was added (10 mg per 1 ml Powder) and mixed with water. The powder was dissolved per manufacturer's recommendations. The solution was mixed for 30 s and applied to the tooth surface as recommended by the manufacturer (as described above). The main steps are shown in FIG. 3.

The glass-ionomer cement cured to yield a hard restoration undistinguishable from a restoration applied without combination with P11-4 (data not shown). No differences could be determined up to one week after application.

Example 4—Prevention of Secondary Caries

Teeth with artificial ICDAS class 4 lesions, generated by drilling in an excised bovine incisor, are treated with dental sealant (e.g., glass-ionomer (for example, Aqual Ionofill Plus, VOCO)) in the absence or presence of P11-4 according to three different protocols:

1) The dental sealant is applied to the cleaned surface of the cavity according to the manufacturer's instructions.
2) A drop of P11-4, 10 mg/mL, pH 8, is applied to the cleaned surface of the cavity so that the surface of the cavity is covered. After the solution has been essentially absorbed by the tooth surface, the dental sealant is applied to the cleaned surface of the cavity according to the manufacturer's instructions.
3) Glass-ionomer cement powder (Aqual Ionofill Plus, VOCO) is prepared according to the manufacturer's instructions. 1 mg P11-4 per 100 mg is added (10 mg per 1 ml Powder) and mixed with water. The powder is dissolved per manufacturer's recommendations. The solution was mixed for 30 s and applied to the tooth surface as recommended by the manufacturer (as described above).

Teeth were stored in distilled water for 24 h. Then, the teeth were thermocycled (500 cycles, 5-55° C.), immersed in basic fuchsine, sectioned, and analysed for dye penetration and remineralisation using a stereomicroscope (e.g., as described by Hepdeniz et al., 2016. Eur J Dent. 10 (2): 163-169).

The formation of mikrogaps or microleakage and shrinking of the dental sealant is monitored over time, and the remineralisation in the location of microgaps analyzed. The different groups are compared.

Example 5—Pulp Capping-Remineralization Due to Pulp and Calcium Phosphate from Blood Supply A cavity exposing the pulp is excavated due to dental caries. The pulp is covered with P11-4 solution (e.g., 100 µl, 10 mg/mL, pH 8) before placing of a dental material, e.g., Resin Composite according to the manufacturer's instructions (e.g., application in layers and light curing, as appropriate).

The pulp remains symptoms free (i.e. no pulpitis), and in a follow-up x-ray after 1 year, retraction of the pulp is assessed.

Example 6—Release Profile

As well-known to the person skilled in the art, a release profile of an agent, i.e. fluoride or self-assembling peptide, depends on the matrix of the material (Mousavinasab et al., 2009, Dent Res J (Isfahan) 6(2):75-81). In the following experiment, the release profile of a model substance mimicking self-assembling peptide, Congo Red, was assessed after the incorporation into the dental material.

The material was prepared and applied as per instructions for use (IFU), usually describing the use of 0.5-0.75 mL of the respective products. To mimic the saliva, Phosphate Buffered Saline (PBS) was used. PBS matches the osmolarity and ion concentrations of the human body—it is isotonic. To mimic the constant saliva flux, the applied amount was placed in a solution equal to 1 h saliva flux, which is about 20 mL. The diffusion of the material was assessed at 500 nm with a photometer.

| Material | | | | |
|---|---|---|---|---|
| Name | Supplier | Article ID | Lot | Sample ID |
| Duraphat (Duraphat ® dental suspension, varnish) | Colgate | Na | 227955 | A |
| Aqua Ionofil Plus (glass ionomer restorative material) | Voco | 1513 | 1827129 | B |
| Paro-Amin Fluor Gelée | Esro | — | 1919-1 | 2 |
| PBS-Taps | Sigma | P4417 | | |
| Water | Credentis | — | — | |
| Oligopeptide-104 | Bachem | E104 | 1000020803 | — |
| Congo Red | Sigma | C6767 | BCBR1055 | |
| Ethanol | Credentis | — | — | |
| Syringe 1 mL | Codan | — | — | |
| Balance | Mettler Toledo | AE200 | — | |
| UV VIs | Pharmacia | LKB Ultraspec II | — | |
| UV cuvette | Brand | — | — | |
| Spatula | | | | |
| Microscopic Slides | VWR | — | — | |
| Eppendorf tube 2 mL | VWR | — | — | |
| 50 mL centrifugation tube | VWR | — | — | |

Release Profile a) Preparation of Varnish (Duraphat) and Paro Amin Fluor Gelée

Per suppliers IFU, it is recommend to add 0.5-1 mL of the varnish to a carious site. The concentration of Congo Red was chosen to lead a distinct signal in the UV Vis.

Place 12 mg Congo Red in 2 mL Eppendorf tube

Add 2 mL of the varnish directly into the tube with a syringe

Mix Congo Red and varnish vigorously until content uniformity is reached

Pick up product with syringe

Place 0.5-0.75 ml of the product on a microscopic slide as a thin film—as recommended per IFU Let it air dry—as per IFU b) Preparation of Ionofil (Glass Ionomer Restorative Material)

Place 12 mg Congo Red directly in a dental cup

Add 2 spoons of Ionofil Plus as per IFU

Add 2 drops of water and mix as per IFU

Place amount of product on microscopic slide c) Incubation

Prepare the PBS Solution with 1% EtOH for preservation

Place slide in 50 ml centrifugation tube

Add 20 mL of PBS

Place on rotating wheel d) Measurement and Calculation

Directly decant 1 mL of incubated fluid into UV-Cell

Measure at 500 nm, control/blank=PBS with 1% EthOH subtract control w/o Congo Red from measured value Results and Discussion Independent on the formulation of the material, the model substance incorporated easily into the products. This is shown by the visual assessment of content uniformity, since a homogenous red/brown dispersion is visible.

The model substance is also able to diffuse from all three fluoride containing preparations into the artificial saliva. Depending on the formulation, the release profile of the individual formulations is different.

The model substance Congo red was released from the varnish Duraphat and the glass ionomer cement (FIG. 4A), as well as from paro Amin Fluor Gelée used for comparison (FIG. 4B). Release from the varnish was quicker than from the glass ionomer cement. It can be seen that release from the glass ionomer cement was constant and increases with time.

Example 7—Release Profile of P11-4

Example 7 was in essence carried out as Example 6, but with the self-assembling peptide P11-4, if not otherwise described. 12 mg of P11-4 (credentis AG), in monomeric form, were added to either the varnish Duraphat (Sample ID: AP) or the glass ionomer cement Aqua Ionofil Plus (Sample ID BP) in the amounts and under the conditions described above. The incubation was carried out in a static manner at room temperature. Measurement was at 280 nm, and the control value for buffer without peptide was subtracted from the measured value.

The results are shown in FIG. 4C. Confirming the data before, the experiment shows a surprisingly good diffusion of the peptide out from the matrix tested, i.e. Duraphat (Sample AP) or Aqua Ionofil Plus (BP), confirming the data gained with the model substance.

P11-4 is slowly and substantially constantly released from both the varnish and the glass ionomer cement. The amount of released peptide increases with time, which was measured for several days. The release from varnish is quicker than the release from the gloss ionomer cement. Thus, depending on the formulation, a slow release can be obtained by using a sealant such as a glass ionomer cement, or a "fast" release with a varnish, e.g., a collophonium containing formulation. A fast release as seen with the varnish e.g., Duraphat, may have beneficial impact on the performance of the peptide shortly after application, which may be particularly helpful, e.g., for remineralisation of lesions covered by varnish.

On the other hand, a longer release may further be particularly advantageous for prevention or treatment of secondary lesions-that may slowly develop over time-under, or at the edges of sealant on treated (filled) lesions. It is reasonable to conclude that the agent will be released from the sealant, e.g., the glass ionomer cement over a longer period of time than from varnish. This is appropriate, as the average time of the sealant, e.g., glass-ionomer cement, on the tooth is also longer than for varnish. Further, self-assembling peptide released from a filling may remain in place for a long time.

The invention claimed is:

1. A composition comprising:
   a) a self-assembling peptide, wherein the self-assembling peptide is in predominantly monomeric form, and
   b) a dental agent that is a
      a dental sealant selected from the group consisting of a glass-ionomer cement-based sealant and a resin-modified glass-ionomer cement.

2. The composition of claim 1, wherein the sealant is a glass-ionomer cement-based sealant.

3. A kit comprising, in separate form, the components:
   a) a self-assembling peptide, wherein the self-assembling peptide is in predominantly monomeric form, and
   b) a dental agent that is a glass-ionomer cement-based dental sealant selected from the group consisting of a glass-ionomer cements and a resin-modified glass-ionomer cements.

4. The kit of claim 3, wherein the dental agent is capable of releasing fluoride ions.

5. The kit of claim 3, wherein the dental agent is permeable for and to ions.

6. The kit of claim 3, wherein the self-assembling peptide undergoes self-assembly at a pH below 7.5.

7. The kit of claim 3, wherein the self-assembling peptide undergoes self-assembly at a pH of at least 7.5.

8. The kit of claim 3, wherein the self-assembling peptide comprises a sequence of the formula X1-X2-X1-X2-X1, wherein X1 is an amino acid with an acidic side chain and X2 is an amino acid with a hydrophobic side chain.

9. The kit of claim 3, wherein the self-assembling peptide comprises the amino acid sequence SEQ ID NO: 1 or an amino acid sequence having at least 80% identity thereto.

10. A method for preventing secondary caries after failure of the dental agent in treatment of a cavitated carious lesion comprising administering to a subject the components of the kit claim 3.

11. The method of claim 10, wherein the treatment of the carious lesion comprises steps of
  a) cleaning of the tooth surface,
  b) optionally, drying of the tooth surface,
  c) optionally, etching the tooth surface, and
  d) administering the composition or the components of the kit to the carious lesion, and
  e) optionally, curing the dental agent.

12. A method for pulp capping comprising administering to a carious lesion in contact with pulp components of the kit of claim 3.

13. The kit of claim 6, wherein the self-assembling peptide is P11-4.

14. The kit of claim 7, wherein the self-assembling peptide is P11-8.

15. A method for preventing secondary caries after failure of the dental agent in treatment of a cavitated carious lesion comprising administering to a subject the composition of claim 1.

16. A method for pulp capping comprising administering to a carious lesion in contact with pulp the composition of claim 1.

17. The composition of claim 1, wherein the composition is a pharmaceutical composition.

18. The composition of claim 1, wherein the dental sealant is a resin-modified glass-ionomer cement.

19. The kit of claim 4, wherein the dental agent is also capable of releasing calcium ions.

* * * * *